(12) United States Patent
Ishibashi et al.

(10) Patent No.: US 10,087,007 B2
(45) Date of Patent: Oct. 2, 2018

(54) CART-TYPE TRANSPORTING DEVICE

(71) Applicant: Daifuku Co., Ltd., Osaka (JP)

(72) Inventors: Masahiro Ishibashi, Osaka (JP);
Junichi Muranaga, Osaka (JP);
Shigeru Baba, Osaka (JP); Yukichi Tamura, Osaka (JP); Shigeyuki Kusuhara, Osaka (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/590,557

(22) Filed: May 9, 2017

(65) Prior Publication Data

US 2017/0253434 A1 Sep. 7, 2017

Related U.S. Application Data

(63) Continuation of application No. PCT/JP2015/079132, filed on Oct. 15, 2015.

(30) Foreign Application Priority Data

Nov. 11, 2014 (JP) ................. 2014-228730

(51) Int. Cl.
*B65G 17/12* (2006.01)
*B65G 17/14* (2006.01)
(Continued)

(52) U.S. Cl.
CPC ........... *B65G 17/123* (2013.01); *B65G 17/14* (2013.01); *B65G 17/12* (2013.01); *B65G 17/38* (2013.01); *B65G 17/42* (2013.01); *B65G 17/48* (2013.01)

(58) Field of Classification Search
CPC .... B65G 17/002; B65G 17/12; B65G 17/123; B65G 17/14; B65G 17/38; B65G 17/42;
(Continued)

(56) References Cited

U.S. PATENT DOCUMENTS 2,082,206 A * 6/1937 Jennings .............. B65G 17/123
12/1 A
2,893,538 A * 7/1959 Buttironi ................ B65G 35/08
198/795

(Continued)

FOREIGN PATENT DOCUMENTS

JP H06171718 A 6/1994
JP 2011079624 A 4/2011
JP 2011079624 A * 4/2011

*Primary Examiner* — Gene O Crawford
*Assistant Examiner* — Keith R Campbell
(74) *Attorney, Agent, or Firm* — St. Onge Steward Johnston & Reens LLC

(57) ABSTRACT

A cart-type transporting device includes left and right auxiliary rotating bodies moving in conjunction with left and right turning-section toothed wheels that guide a first endless chain; and a turning pathway section that protrudes at a position between the auxiliary rotating bodies, and that is provided with a lower protruding cam over which a transporting cart can pass. Left and right front-side projection shafts of the transporting cart engage with an engagement section of the respective auxiliary rotating bodies. Left and right rear-side projection shafts engage with an engagement section of the first endless chain. When the projection shafts are picked up by the rotation of the turning-section toothed wheels and the auxiliary rotating bodies, the lower protruding cam supports and guides a cam-following roller at a bottom section of the transporting cart in accordance with the same rotating pathway as the engagement section.

9 Claims, 22 Drawing Sheets

(51) Int. Cl.
 *B65G 17/38* (2006.01)
 *B65G 17/42* (2006.01)
 *B65G 17/48* (2006.01)

(58) Field of Classification Search
 CPC ........ B65G 17/44; B65G 17/48; B65G 35/06; B65G 47/57
 USPC .................................................. 198/797, 799
 See application file for complete search history.

(56) References Cited

U.S. PATENT DOCUMENTS

| | | | | |
|---|---|---|---|---|
| 3,243,032 A * | 3/1966 | Chambon | ................ | A21B 1/46 |
| | | | | 198/465.3 |
| 3,850,106 A * | 11/1974 | Krivec | ...................... | B61B 9/00 |
| | | | | 104/127 |
| 6,336,549 B1 * | 1/2002 | Jen | ....................... | B65G 17/123 |
| | | | | 198/800 |
| 9,796,531 B2 * | 10/2017 | Ishibashi | ................ | B65G 17/18 |
| 2017/0240359 A1 * | 8/2017 | Ishibashi | .............. | B65G 17/123 |

* cited by examiner

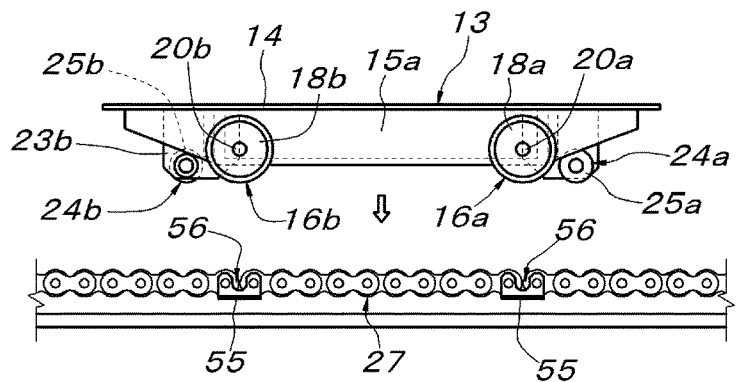
FIG. 2(A)
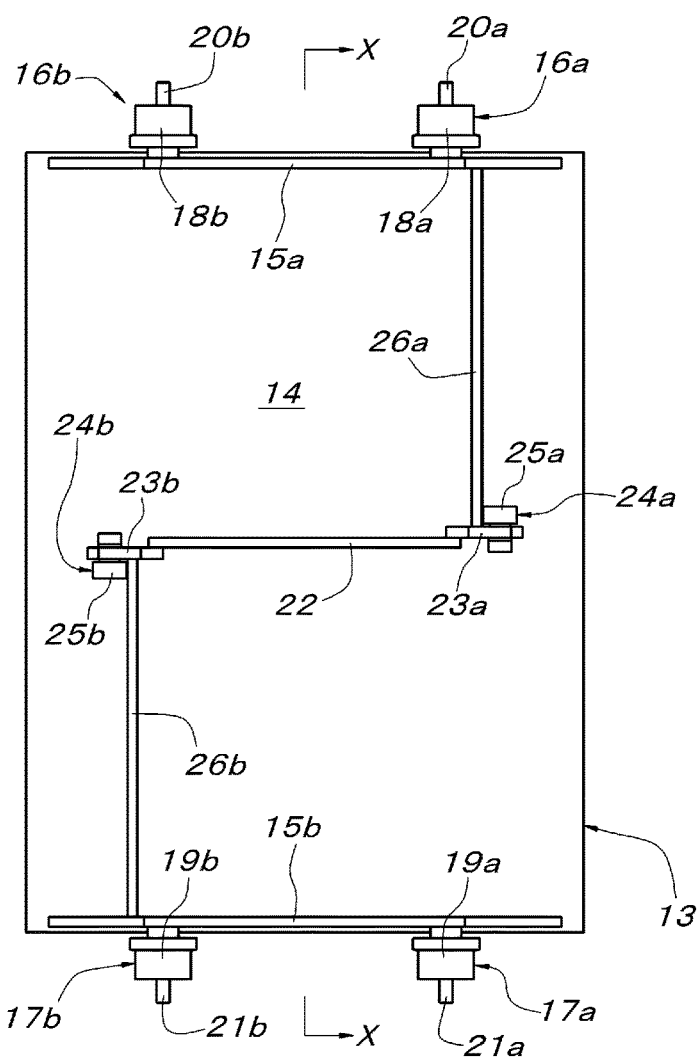
FIG. 2(B)
FIG. 2(C)

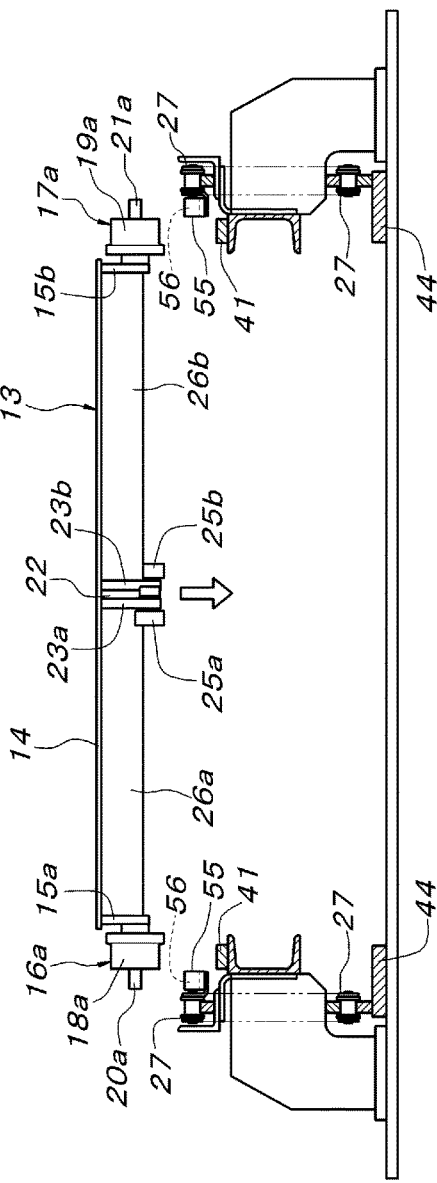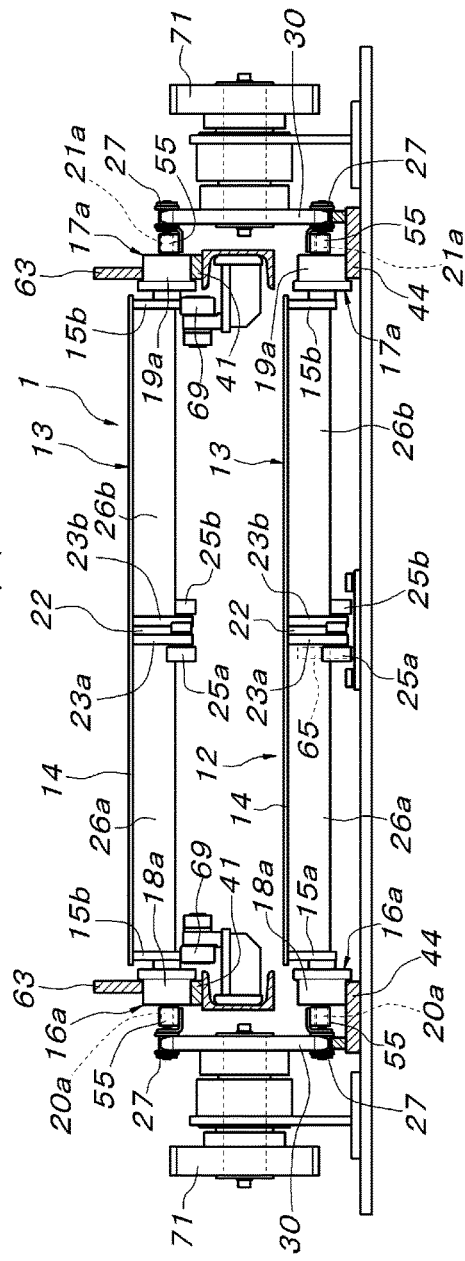

CART-TYPE TRANSPORTING DEVICE

FIELD OF THE INVENTION

The present invention relates to a cart-type transporting device in which a transporting cart travels on a given traveling pathway while constantly keeping a horizontal upright posture.

BACKGROUND OF THE INVENTION

Various types of cart-type transporting devices have been known in which a traveling pathway that includes a turning pathway section in a vertical direction between a horizontal pathway section and a separate traveling pathway section connected thereto, a transporting cart that travels the traveling pathway while keeping a horizontal upright posture and a drive means that makes the transporting cart travel in the traveling pathway are provided. For example, in a cart-type transporting device disclosed in Japanese Published Unexamined Patent Application No. H6-171718 (Patent Literature 1), wheels which are pivotally supported to both left and right sides of a transporting cart and which are provided so as to protrude are used as engaged sections; in a turning pathway section between horizontal pathway sections in two upper and lower stages, a pair of left and right first rotating bodies which are concentric with the turning-section toothed wheels of a pair of left and right endless chains for driving and propelling the transporting cart in the horizontal pathway sections and a pair of left and right second rotating bodies which are pivotally supported to a position apart from the first rotating bodies in a direction in which the horizontal pathway sections extend are arranged; both the front and rear rotating body pairs are coupled in an interlocking manner to the endless chains; the two front and rear engaged sections (the wheels) of the transporting cart are fitted to engagement sections around the respective rotating bodies, that is, wheel fitting concave sections; and in a state where the transporting cart is supported with the two front and rear pairs of left and right rotating bodies, by the synchronous rotation of these rotating bodies, the transporting cart is transferred between the horizontal pathway sections in the two upper and lower stages while keeping a horizontal upright posture. Although in the configuration of Japanese Published Unexamined Patent Application No. H6-171718 (Patent Literature 1), the first rotating bodies are concentrically coupled in an interlocking manner separately of the turning-section toothed wheels of the endless chains rotating along the horizontal pathway sections, a configuration in which a bifurcated member corresponding to the engagement sections (the wheel fitting concave sections) formed in the rotating bodies is attached to the pair of left and right endless chains and in which thus the first rotating bodies are omitted has been conventionally known in this type of cart-type transporting device, for example, in Japanese Published Unexamined Patent Application No. 2011-79624 (Patent Literature 2), etc.

SUMMARY OF THE INVENTION

Although it can be considered that, as described above, the first rotating body described in Japanese Published Unexamined Patent Application No. H6-171718 (Patent Literature 1) corresponds to the endless chain which engages with the turning-section toothed wheel and the engagement section attached to the endless chain, in any case, for example, in a case where the transporting cart is turned upward from the horizontal pathway section, when the front-side engaged section of the transporting cart engages with the engagement section of the second rotating body and is thereby scooped upward, the rear-side engaged section of the transporting cart also engages with the engagement section of the first rotating body (or the engagement section of the endless chain) and is thereby scooped up. Since immediately after the start of the scooping-up, the direction of the engagement section of each rotating body is brought from a state where it is vertically downward to a state where it is obliquely downward with respect to the forward direction, it is impossible to scoop the transporting cart upward only by pushing out the transporting cart forward. Although in the conventional configuration such as the configuration described in Japanese Published Unexamined Patent Application No. H6-171718 (Patent Literature 1), in the phenomenon described above, the front-side engaged section of the transporting cart is received by an arc-shaped guide rail laid along the surrounding of the second rotating body, and thus the transporting cart is prevented from being pushed out forward, a measure for directly preventing the rear-side engaged section from being pushed out from the engagement section of the first rotating body (or the engagement section of the endless chain) is not taken. Hence, immediately after the start of the scooping-up, the forward-pushing out force which acts on the rear-side engaged section is also received by the front-side engaged section of the transporting cart and the arc-shaped guide rail that is laid along the surrounding of the second rotating body for receiving the front-side engaged section. Consequently, significant strength beyond the original necessary strength is required for those, and moreover, it is difficult to smoothly start the scooping-up operation.

In order to improve the problems described above, it can be considered that a second rear-side engaged section, for example, a cam-following roller is provided on the outer side of the rear-side engaged section of the transporting cart so as to protrude, and that a guide rail for guiding both left and right sides on the rear end side of the transporting cart obliquely upward with respect to the forward direction in the same path as that of the engagement section of the first rotating body (or the engagement section of the endless chain) via the cam-following roller is laid. However, in this configuration, the left/right width of the entire transporting cart is significantly increased as compared with the width of a loading platform, and thus the space occupied by the traveling pathway significantly increases. Since a load on the rear half portion of the transporting cart is received by the second rear-side engaged section (such as the cam-following roller) which largely extends from the transporting cart (the loading platform) in a lateral direction, it is difficult to apply this configuration to a transporting device for transporting a heavy item. Furthermore, although this configuration can be practiced in a case where the traveling direction of the transporting cart is determined to be one direction, when it is also desired to make the transporting cart travel backward, it is necessary to provide the second front-side engaged section on the outer side of the front-side engaged section of the transporting cart. An extremely complicated mechanism is needed in order to achieve a configuration in which the second rear-side engaged section and the second front-side engaged section are selectively made to act according to the traveling direction of the transporting cart, with the result that it is difficult to practically adopt this configuration.

The present invention provides a cart-type transporting device which can solve the conventional problems described above, and for ease of understanding of a relationship with an embodiment which will be described later, the cart-type transporting device according to the present invention will be shown below with reference symbols which are used in the description of the embodiment and which are placed in parentheses. In the cart-type transporting device including: a traveling pathway which includes a turning pathway section (11) in an vertical direction between a horizontal pathway section (12) and a separate traveling pathway section (1) connected thereto; a transporting cart (13) which travels the traveling pathway while keeping a horizontal upright posture; and a drive means which makes the transporting cart (13) travel in the traveling pathway, the transporting cart (13) is supported via wheels (18a to 19b) such that the transporting cart (13) can travel on guide rails (44, 41), and includes engaged sections (16a to 17b) which are provided at two front and rear places on each of both left and right sides so as to protrude horizontally and laterally and an auxiliary supported section (24a) which is provided at a bottom section, the drive means includes a pair of left and right endless chains (27) rotating along the traveling pathway through a turning-section toothed wheel (30) pivotally supported to the turning pathway section (11), a pair of left and right auxiliary rotating bodies (49) which interlock with the endless chains (27) and an auxiliary guide member, in each of the pair of left and right endless chains (27), engagement sections (55) which are detachably fitted to a pair of the front and rear engaged sections (16a to 17b) of the transporting cart (13) are provided, the auxiliary rotating body (49) includes an engagement section (49a, 49b) which is pivotally supported in a position by only an interval between the pair of front and rear engaged sections (16a to 17b) apart from the turning-section toothed wheel (30) in a horizontal direction and which engages with the engaged section (16b, 17b) removed from the engagement section (55) of the endless chain (27), the auxiliary guide member includes a lower protruding cam (65) which is provided at such a height so as not to interfere with the transporting cart (13) that enters and exits the turning pathway section (11) at the lowest level and which supports and guides the auxiliary supported section (24a) of the transporting cart (13) that turns and a pair of left and right engaged-section-guiding guide rails (61) which are laid along an outer side of an engaged section rotating pathway on a side far from the horizontal pathway section (12), and the lower protruding cam (65) maintains, in a lower end side region of an engaged section (16a, 17a) rotating pathway on a side close to the horizontal pathway section (12), an engagement state of the engagement section (55) of the endless chain (27) and the engaged section (16a, 17a) of the transporting cart (13).

Although the reference symbols in parentheses are indicated according to the configuration of the sixth turning pathway section (11) of the embodiment, when the turning pathway section in which the turning-section toothed wheel (31) of the endless chain (27) and the auxiliary rotating body (51) are arranged so as to be reverse in front and rear with respect to the horizontal pathway section (1), that is, the first turning pathway section (2) of the following embodiment is referenced, a configuration is provided in which the horizontal pathway section is the first horizontal pathway section (1), the separate traveling pathway section is the first lifting/lowering pathway section (3) and the lower protruding cam (87) maintains, in a lower end side region of an engaged section (16a, 17a) rotating pathway on a side close to the horizontal pathway section (1), an engagement state of the engagement section (57) of a second endless chain (28) and the engaged section (16a, 17a) of the transporting cart (13). Although the portions in the following embodiment to which the present invention is applied include the fourth horizontal pathway section (12) and the first horizontal pathway section (1) connected with the sixth turning pathway section (11) described above, the first horizontal pathway section (1) and the first lifting/lowering pathway section (3) connected with a first turning pathway section (2), as well as a second horizontal pathway section (5) and a third horizontal pathway section (7) connected with a third turning pathway section (6), and a second lifting/lowering pathway section (9) and the fourth horizontal pathway section (12) connected with a fifth turning pathway section (10), it is also clear from the following description that the case where the traveling direction of the transporting cart (13) in these respective turning pathway sections is reversed is included.

The above-described basic Configuration A according to the present invention can be embodied and practiced as follows.

"Configuration B"

The engaged sections (16a to 17b) are formed with wheels (18a to 19b) which are pivotally supported to the two front and rear places on each of both the left and right sides of the transporting cart (13) and which include projection shafts (20a to 21b) that are provided so as to protrude outward and concentrically, and the engagement sections (55) of the endless chains (27) are formed with members which include concave sections that fit in the vertical direction to the projection shafts (20a to 21b) in the horizontal pathway section. The Configuration B is practiced in combination with the Configuration A.

"Configuration C"

The auxiliary supported sections (24a, 24b) are provided at two front and rear places in a center section of the bottom section of the transporting cart (13) in a left/right width direction, and the two front and rear auxiliary supported sections (24a, 24b) are displaced in the left/right width direction of the transporting cart (13) so as not to overlap each other when the transporting cart (13) is seen in a front view. The Configuration C can be practiced in combination with the Configuration A or the Configuration B.

"Configuration D"

The transporting cart (13) is formed such that the wheels (18a to 19b) are pivotally supported to the outer sides of both left and right side plates (15a, 15b) which are provided so as to protrude downward from both left and right sides of a top plate (14), the two front and rear auxiliary supported sections (24a, 24b) are attached to a lower side of the top plate (14), a space below the top plate from the auxiliary supported section (24a) on the front side to a rear end of the transporting cart (13) is opened backward, and the auxiliary supported section (24a) on the front side can be directly viewed from behind through the space below the top plate, and a space below the top plate from the auxiliary supported section (24b) on the rear side to a front end of the transporting cart (13) is opened forward, and the auxiliary supported section (24b) on the rear side can be directly viewed from the front thereof through the space below the top plate. The Configuration D is practiced in combination with the Configuration C.

"Configuration E"

The auxiliary supported section (24a, 24b) is formed with a cam-following roller (25a, 25b) which is pivotally supported with a horizontal support shaft in a left/right direction. The Configuration E can be practiced in combination with at least one of the Configurations A to D.

"Configuration F"

The separate traveling pathway section is connected downward from the horizontal pathway section (7) through the turning pathway section (8), in the horizontal pathway section (7), a transporting cart inclination prevention means is also provided which prevents the wheels (18b, 19b) of the transporting cart (13) from dropping between the turning-section toothed wheel (34) of the horizontal pathway section (7) and the auxiliary rotating body (53), and the transporting cart inclination prevention means is formed with an upper guide rail (101) which is laid on an upper side of the horizontal pathway section (7) so as to cover the wheels (18a, 19a) of the transporting cart (13) from above and a support guide roller (98) which is pivotally supported to a lower side of the horizontal pathway section (7) so as to support the transporting cart (13). The Configuration F can be practiced in combination with at least one of the Configurations A to E.

"Configuration G"

In the transporting cart inclination prevention means, a lower guide rail (99b) is additionally provided which is laid between the turning-section toothed wheel (34) and the auxiliary rotating body (53) except a wheel (18a, 19a) rotating pathway on a side close to the horizontal pathway section (7) among the front and rear wheels (18a to 19b) of the transporting cart (13) and which supports the wheels (18b, 19b) of the transporting cart (13) from below. The Configuration G is practiced in combination with the Configuration F.

"Configuration H"

The separate traveling pathway section is a lifting/lowering pathway section (3) which is connected upward from the horizontal pathway section (1) through the turning pathway section (1), in the lifting/lowering pathway section (3), a first endless chain (27) which is continuous with the horizontal pathway section (1) through the turning-section toothed wheel (31) and a second endless chain (28) which interlocks with the first endless chain (27) so as to rotate along the lifting/lowering pathway section (3) are provided, the second endless chain (28) is located closer to the horizontal pathway section (1) than the first endless chain (27) in the lifting/lowering pathway section (3), a lower end guide toothed wheel (36) thereof and the turning-section toothed wheel (31) are pivotally supported at the same height higher than the first endless chain (27) of the horizontal pathway section (1), the first endless chain (27) of the horizontal pathway section (1) is inclined obliquely upward at a lower end of the lifting/lowering pathway section (3), the auxiliary rotating body (51) is provided so as to rotate concentrically and integrally with the lower end guide toothed wheel (36) of the second endless chain (28), the engagement section (51a, 51b) of the auxiliary rotating body (51) is formed with a concave section to and from which the wheel (18b, 19b) where the projection shaft (20b, 21b) is fitted to the engagement section (57) of the second endless chain (28) can be detachably fitted, and the lower protruding cam (87) of the auxiliary guide member allows the engaged section (16b, 17b) of the transporting cart (13) to be transferred between the engagement sections (57, 51a, 51b) of the second endless chain (28) rotating around the lower end guide toothed wheel (36) and the auxiliary rotating body (51) and the engagement section (55) of the first endless chain (27) in a position directly below the lower end guide toothed wheel (36) of the first horizontal pathway section (1). The Configuration H can be practiced in combination with at least one of the Configurations B to E.

"Configuration I"

The separate traveling pathway section is a lifting/lowering pathway section (9) which is connected upward from the horizontal pathway section (12) through the turning pathway section (10), in the lifting/lowering pathway section (9), a first endless chain (27) which is continuous with the horizontal pathway section (12) through the turning-section toothed wheel (35) and a second endless chain (29) which interlocks with the first endless chain (27) so as to rotate along the lifting/lowering pathway section (9) are provided, the second endless chain (29) is located farther from the horizontal pathway section (12) than the first endless chain (27) in the lifting/lowering pathway section (9), the auxiliary rotating body (54) is pivotally supported to a lower end guide toothed wheel (39) of the second endless chain (29) so as to be adjacent to a side where the turning-section toothed wheel (35) is present, the engagement section (54a, 54b) of the auxiliary rotating body (54) is formed with a concave section to and from which the wheel (18a, 19a) where the projection shaft (20a, 21a) is fitted to the engagement section (58) of the second endless chain (29) can be detachably fitted, and the lower protruding cam (110) of the auxiliary guide member maintains, in the lower end side region of the engaged section (55) rotating pathway around the turning-section toothed wheel (35), an engagement state of the engagement section (55) of the first endless chain (27) and the engaged section (16b, 17b) of the transporting cart (13). The Configuration I can also be practiced in combination with at least one of the Configurations B to E.

In a case where the configuration of the present invention described above is applied to the turning pathway section between the upper horizontal pathway section and the lower horizontal pathway section which vertically overlap each other, the pair of left and right endless chains can be continuously stretched via the turning-section toothed wheel from one horizontal pathway section to the other horizontal pathway section. In this case, when seen from the side of the horizontal pathway section, the turning-section toothed wheel is located on the inner side, and the auxiliary rotating body is located on the outer side. However, in a case where the horizontal pathway section and the lifting/lowering pathway section serving as the separate traveling pathway section are perpendicularly connected via the turning pathway section, as shown in the Configurations H and I described above, the endless chain which engages with the pair of left and right front-side engaged sections of the transporting cart and the endless chain which engages with the pair of left and right rear-side engaged sections of the transporting cart are inevitably juxtaposed to the lifting/lowering pathway section, any one of both the endless chains serves as the endless chain which is stretched along the horizontal pathway section and the other endless chain is additionally stretched as the second endless chain. Basically, since the endless chain stretched along the horizontal pathway section is guided via the turning-section toothed wheel to the inner side (the side close to the horizontal pathway section) of the lifting/lowering pathway section, and the second endless chain is additionally stretched on the outer side of the lifting/lowering pathway section, when seen from the side of the horizontal pathway section, the turning-section toothed wheel is located on the inner side, and the auxiliary rotating body is located on the outer side. However, since depending on the configuration on the side of the other end of the lifting/lowering pathway section, the endless chain stretched along the horizontal pathway section is guided via the turning-section toothed wheel to the outer side (the side far from the horizontal pathway section) of the lifting/lowering pathway section, and the second endless chain is additionally stretched on the inner side of the lifting/lowering pathway section, in this case, when seen from the side of the horizontal pathway section, the turning-section toothed wheel is located on the outer side, and the auxiliary rotating body is located on the inner side.

Although various embodiments can be considered as described above, as an example, a case where the configuration of the present invention described above is applied to the place (the sixth turning pathway section 11 in the following embodiment) where the transporting cart is turned upward from the lower horizontal pathway section to the upper horizontal pathway section serving as the separate traveling pathway section will be described. Although the front-side engaged section of the transporting cart is disengaged from the engagement section of the endless chain rotating upward around the turning-section toothed wheel, and thereafter moves to such a position so as to be fitted to the engagement section of the auxiliary rotating body as the transporting cart moves horizontally and forward, in this process, the transporting cart which enters the turning pathway section at the lowest level moves thereon without interfering with the lower protruding cam of the auxiliary guide member. Then, when the rear-side engaged section of the transporting cart which is fitted to the engagement section on the side of the endless chain and the front-side engaged section of the transporting cart which is fitted to the engagement section of the auxiliary rotating body are scooped obliquely upward with respect to the forward direction by the rotation of the turning-section toothed wheel and the rotation of the auxiliary rotating body, the auxiliary supported section present at the bottom section of the transporting cart which has reached the position directly in front of the lower protruding cam is transferred onto the lower protruding cam. Hence, the cam surface of the lower protruding cam is formed such that the movement path of the auxiliary supported section on the lower protruding cam substantially coincides with the rotation path of the engagement section on the side of the endless chain and the engagement section of the auxiliary rotating body coinciding with each other, and thus it is possible to reliably prevent the transporting cart from moving by gravity such that the engaged section of the transporting cart slides obliquely downward with respect to the forward direction from the engagement section on the side of the endless chain and the engagement section of the auxiliary rotating body until the auxiliary supported section is disengaged upward from on the lower protruding cam.

At this time, as in the conventional manner, with the arc-shaped engaged-section-guiding guide rail laid along the surrounding of the auxiliary rotating body, it is possible to prevent the pair of left and right front-side engaged sections of the transporting cart from sliding and removing obliquely downward with respect to the forward direction from the engagement section of the auxiliary rotating body. Hence, in the transporting cart, the operation of scooping obliquely upward with respect to the forward direction is started in a state where the position of the pair of left and right front-side engaged sections apart forward from the horizontal pathway section is supported by the pair of left and right engagement sections of the auxiliary rotating body and where simultaneously, the position of the auxiliary supported section present at the rear-side bottom section close to the horizontal pathway section is supported by the lower protruding cam, in other words, a state of a horizontal upright posture supported by at least three points. When the endless chain and the auxiliary rotating body further rotate, and thus the auxiliary supported section is disengaged from the lower protruding cam, the engagement section of the endless chain around the turning-section toothed wheel rotates forward and upward from 0 degrees heading directly downward by the corresponding angle, and thus the function of supporting the rear-side engaged section of the transporting cart is enhanced, with the result that as described previously, the transporting cart is scooped upward in the horizontal upright posture where the four places, that is, front and rear and left and right places, are supported by the pair of left and right auxiliary rotating bodies and the pair of left and right endless chains together with the presence of the arc-shaped engaged-section-guiding guide rail laid along the surrounding of the auxiliary rotating body.

When the transporting cart scooped up to the position directly above the auxiliary rotating body and the turning-section toothed wheel is drawn into the horizontal pathway section by the engagement section of the endless chain, the transporting cart inclination prevention means is needed which prevents the rear-side engaged section (including the wheel) of the transporting cart separated from the engagement section of the auxiliary rotating body from dropping between the auxiliary rotating body and the turning-section toothed wheel. Although as the transporting cart inclination prevention means, a conventional known configuration may be adopted, the Configuration F or the Configuration G described above is preferably adopted such that the additional components on the side of the transporting cart are not needed.

As described above, in the configuration of the present invention, the engaged sections at the four places on the outer side of the transporting cart are supported by the engagement sections of the pair of left and right endless chains and the engagement sections of the pair of left and right auxiliary rotating bodies, and thus the conventional problem in which immediately after the start of the scooping up of the transporting cart along the arc-shaped pathway of the turning pathway section, the rear half portion of the rear-side engaged section of the transporting cart cannot be substantially supported by the engagement section of the endless chain is solved by supporting and guiding the auxiliary supported section of the bottom section of the transporting cart with the lower protruding cam, with the result that in a state where the transporting cart is constantly supported reliably and stably at three points, that is, at the two points where the supported sections on both the left and right sides on the front side are present and at one point where the auxiliary supported section on the rear side is present, the operation of scooping the transporting cart obliquely upward with respect to the forward direction can be smoothly started without a significant burden of strength being applied on the front-side engaged section, the arc-shaped guide rail around the auxiliary rotating body for receiving it and the like. Moreover, since the solution means is formed with the auxiliary supported section of the bottom section of the transporting cart and the lower protruding cam arranged on the lower side of the transporting cart which enters the turning pathway section at the lowest level, the left and right lateral width of the entire transporting cart and hence the left and right lateral width of the traveling pathway are prevented from increasing by providing the additional components on both the left and right sides of the transporting cart so as to protrude, with the result that even for a transporting device for transporting a heavy item, the solution can be easily practiced.

Although the case where the present invention is applied to the place (the sixth turning pathway section 11 in the following embodiment) where the transporting cart is turned upward from the lower horizontal pathway section to the upper horizontal pathway section is described as an example, on the contrary, even in a case where the present invention is applied to the place (the third turning pathway section 6 in the following embodiment) where the transporting cart is turned downward from the upper horizontal pathway section to the lower horizontal pathway section, the same action and effects as described above can be expected. In this case, since the transporting cart sent out from the upper horizontal pathway in its extension direction is supported by the engagement section of the endless chain rotating around the turning-section toothed wheel and the engagement section of the auxiliary rotating body, and is lowered parallel in the shape of an arc, the above problem is prevented from occurring when the lowering operation is started. However, although in the final stage of the lowering operation, the same problem as immediately after the start of the scooping-up operation occurs, in the configuration of the present invention, in the final stage of the lowering operation, the problem can be solved by supporting and guiding the auxiliary supported section of the bottom section of the transporting cart with the lower protruding cam.

Although in a case where the present invention is practiced, the Configurations B to I are combined as necessary, and thus the present invention can be practiced, in a case where the Configuration C is adopted, between the turning pathway section where the transporting cart is lifted from the horizontal pathway section and the turning pathway section where the transporting cart is lowered from the horizontal pathway section, the auxiliary supported section and the lower protruding cam to act thereon are changed, with the result that it is possible to achieve the desired function. In other words, since within one continuous traveling pathway, the turning pathway section where the transporting cart is lifted from the horizontal pathway section and the turning pathway section where the transporting cart is lowered from the horizontal pathway section can be provided in a mixed manner, the degree of freedom in layout of the traveling pathway can be enhanced. In this case, when the Configuration D is adopted, since the auxiliary supported section can also be stored within the range of the height of the transporting cart, and moreover, a state is brought where, in a side view, a large part of the lower protruding cam relatively moves within the transporting cart, it is possible to reduce the height of the turn table pathway section in which the lower protruding cam is provided. Although the auxiliary supported section can be formed with a block material to which a surface material with satisfactory lubricity is adhered, the Configuration E is preferably adopted.

The configuration of the turning pathway section of the present invention can be applied not only to the turning pathway section between both the upper and lower horizontal pathway sections but also to a turning pathway section in a case were the lifting/lowering pathway section (the separate traveling pathway section) which is connected upward from the horizontal pathway section through the turning pathway section. In this case, the Configurations B and H are combined, and thus the present invention is practiced.

BRIEF DESCRIPTION OF THE DRAWINGS

FIG. 2A is a side view showing a transporting cart and its drive endless chain; FIG. 2B is a bottom view of the transporting cart; and FIG. 2C is a cross-sectional view taken along line X-X of FIG. 2B.

FIG. 5A is a partial vertical cross-sectional front view showing a state where the transporting cart is transferred to a first horizontal pathway section; and FIG. 5B is a vertical cross-sectional front view of an endless chain turning section in the sixth turning pathway section.

DETAILED DESCRIPTION OF THE INVENTION

Figure 1:
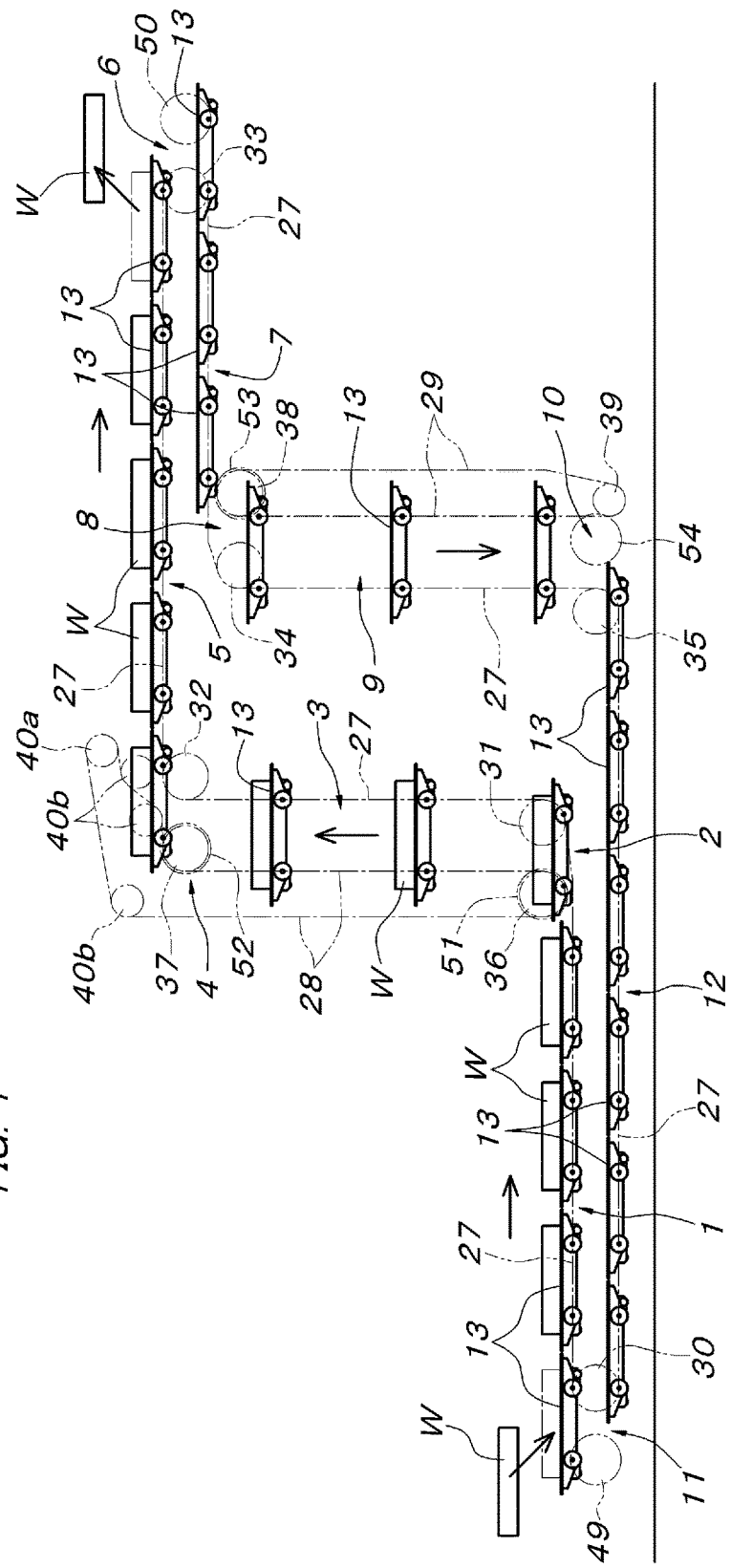
FIG. 1 is a schematic side view showing a transporting cart traveling pathway and a drive endless chain in an entire transporting device.
Figure 3:
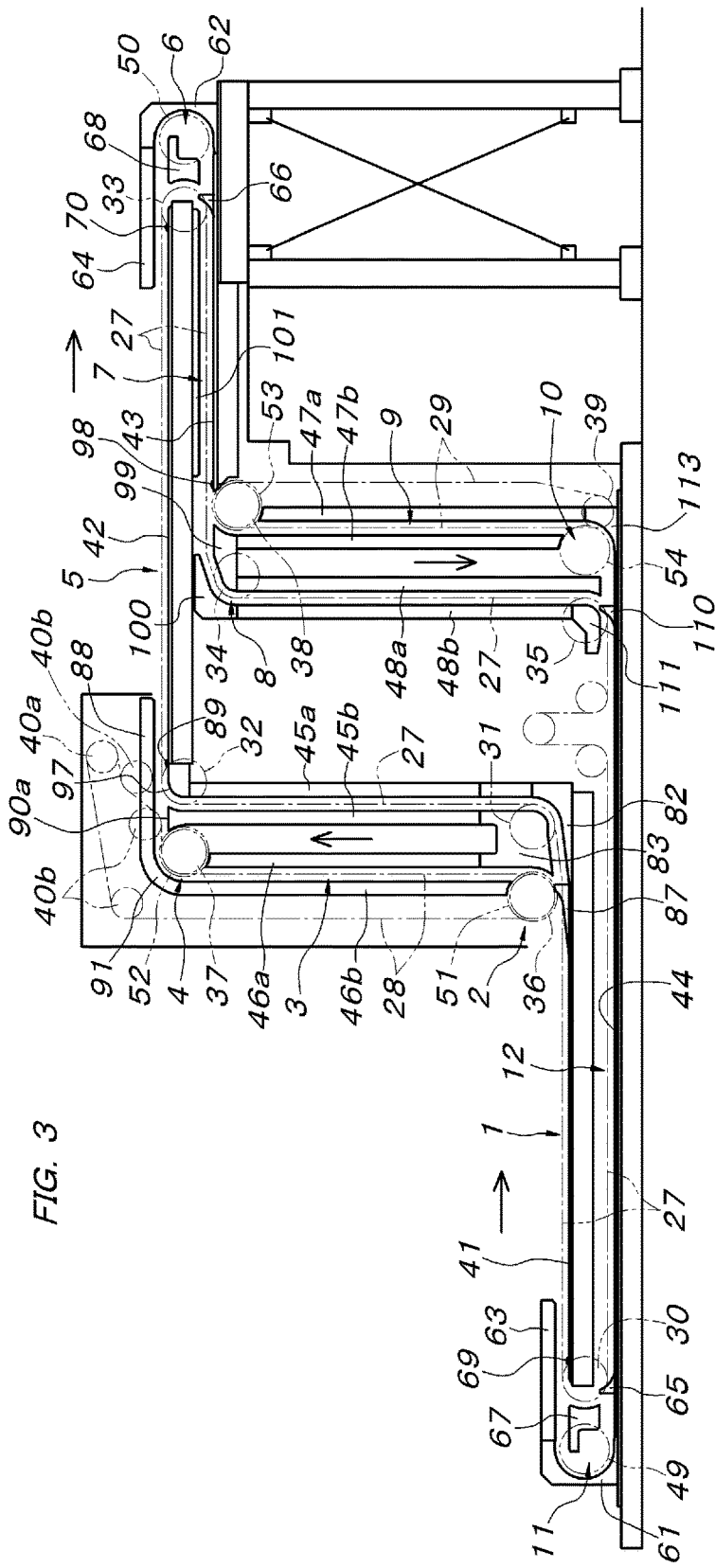
FIG. 3 is a schematic side view showing an arrangement related to guide rails of the entire transporting device.
Figure 4:
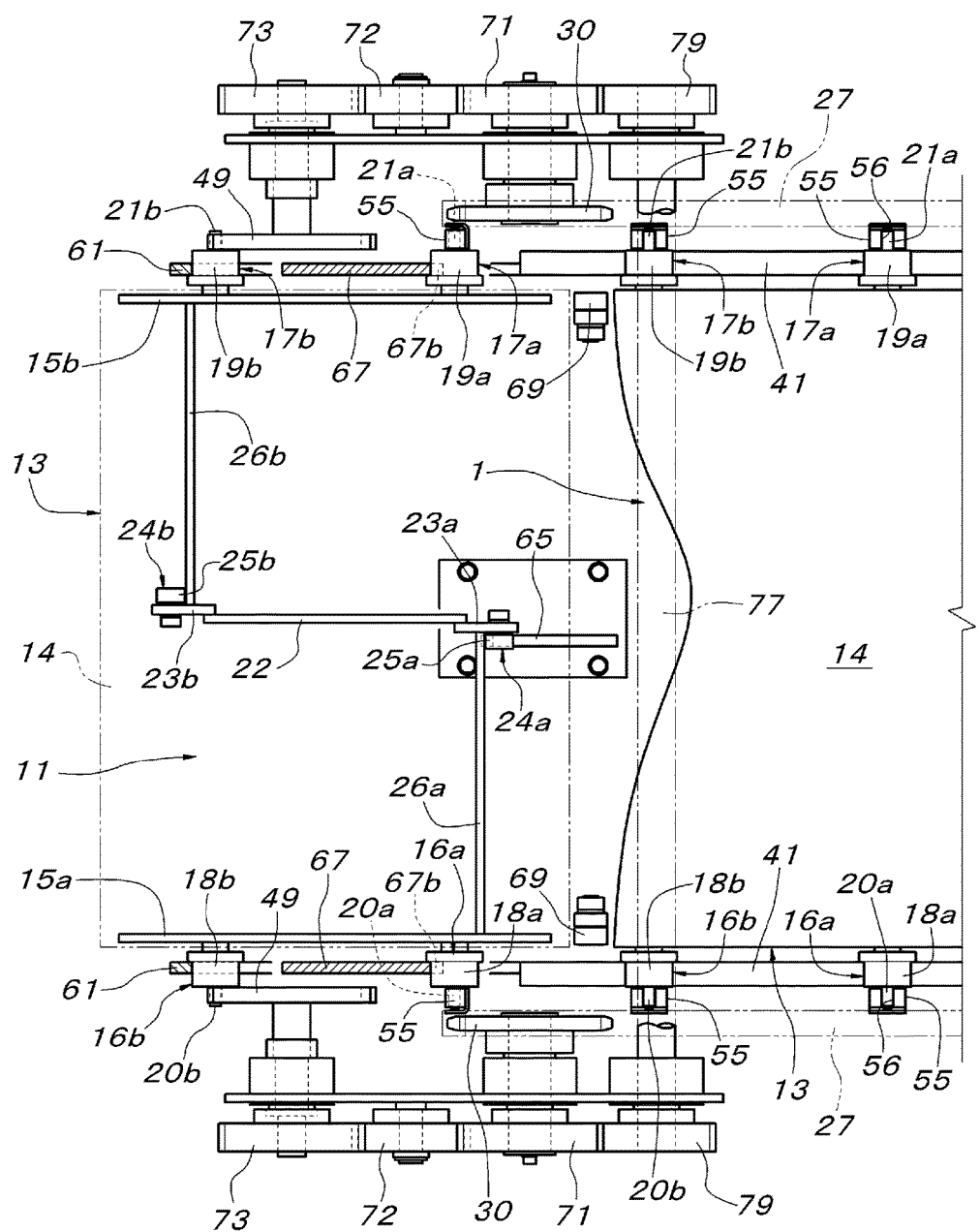
FIG. 4 is a partial cutaway plan view illustrating a sixth turning pathway section.

An embodiment of the present invention will be described below with reference to accompanying drawings. As shown in FIGS. 1 and 3, a transporting device of the embodiment is formed with: a low-position first horizontal pathway section 1; a first lifting/lowering pathway section 3 which is connected upward to one end of the first horizontal pathway section 1 via a first turning pathway section 2; a high-position second horizontal pathway section 5 which is arranged on the opposite side to the side where the first horizontal pathway section 1 is present with respect to the first lifting/lowering pathway section 3 and which is connected to the upper end of the first lifting/lowering pathway section 3 via a second turning pathway section 4; a third horizontal pathway section 7 which overlaps the lower side of the second horizontal pathway section 5 and which is connected to the free end of the second horizontal pathway section 5 via a third turning pathway section 6; a second lifting/lowering pathway section 9 which is connected downward to the free end of the third horizontal pathway section 7 via a fourth turning pathway section 8; and a fourth horizontal pathway section 12 which overlaps the lower side of the first horizontal pathway section 1, in which one end is connected to the lower end of the second lifting/lowering pathway section 9 via a fifth turning pathway section 10 and in which the other end is connected to the free end of the first horizontal pathway section 1 via a sixth turning pathway section 11. The transporting pathway along which a load W is transported by a transporting cart 13 of the transporting device is the first horizontal pathway section 1→the first lifting/lowering pathway section 3→the second horizontal pathway section 5, and the emptied transporting cart 13 is returned to the beginning end part of the first horizontal pathway section 1 through the third horizontal pathway section 7→the second lifting/lowering pathway section 9→the fourth horizontal pathway section 12.

It is a matter of course that, by reversing the flow of the transporting cart 13, the transporting pathway of the load W by the transporting cart 13 can be the second horizontal pathway section 5→the first lifting/lowering pathway section 3→the first horizontal pathway section 1. In any case, in the first turning pathway section 2 to the sixth turning pathway section 11, the transporting cart 13 is turned in the shape of an arc while keeping a horizontal upright posture, and thus the transporting cart 13 travels in all the pathway sections while keeping the horizontal upright posture.

In the transporting cart 13, as shown in FIG. 2, side plates 15a and 15b are fixed so as to be continuous to the lower sides of both the left and right sides of a top plate 14 whose planar shape is rectangular, and engaged sections 16a to 17b are provided at two front and rear places on the outer sides of both the left and right side plates 15a and 15b. The respective engaged sections 16a to 17b are formed with: wheels 18a to 19b which are supported by support shafts in a left/right horizontal direction; and projection shafts 20a to 21b which are concentrically provided so as to protrude outward from the respective wheels 18a to 19b. The respective projection shafts 20a to 21b can be formed by protruding, from the wheels, the support shafts supporting the wheels 18a to 19b. The two front and rear pairs of left and right wheels 18a and 19a and left and right wheels 18b and 19b are arranged concentrically with respect to each other.

On the bottom section of the top plate 14, a center reinforcement plate 22 in a forward/backward direction is attached to a center position in its left/right width direction, and bearing plates 23a and 23b are attached to the left and right side surfaces of the center reinforcement plate 22 on the opposite sides at both front and rear ends thereof and to the top plate 14, and auxiliary supported sections 24a and 24b are attached to the opposite sides of both the bearing plates 23a and 23b to the sides where the reinforcement plate 22 is present. These auxiliary supported sections 24a and 24b are respectively formed with cam-following rollers 25a and 25b which are supported by support shafts in the left/right horizontal direction, and the cam-following rollers 25a and 25b have a sufficiently smaller diameter than the wheels 18a to 19b and are arranged so as not to protrude beyond the lower sides of the wheels 18a to 19b and so as to be separated downward from the top plate 14 as much as possible. Lateral reinforcement plates 26a and 26b whose height is low are fixed to the sides where the cam-following rollers 25a and 25b of the respective bearing plates 23a and 23b are present and between the side surfaces more inward than the cam-following rollers 25a and 25b and both the left and right side plates 15a and 15b so as to be parallel to the left/right width direction of the top plate 14. In the configuration described above, a space under the top plate between the cam-following roller 25a on the front side and the rear end of the top plate 14 is opened in its lower side and is also opened backward, and at least the lower half portion of the cam-following roller 25a on the front side can be directly viewed from the rear of the transporting cart 13, and a space under the top plate between the cam-following roller 25b on the rear side and the front end of the top plate 14 is opened in its lower side and is also opened forward, and at least the lower half portion of the cam-following roller 25b on the rear side can be directly viewed from the front of the transporting cart 13.

As shown in FIG. 1, along an endless transporting cart traveling pathway which starts from the low-position first horizontal pathway section 1 through the first lifting/lowering pathway section 3, the high-position second horizontal pathway section 5, the third horizontal pathway section 7, the second lifting/lowering pathway section 9 and the fourth horizontal pathway section 12 then returns to the original first horizontal pathway section 1, a first endless chain 27 is stretched. In the first lifting/lowering pathway section 3, since the first endless chain 27 is vertically stretched on the side far from the first horizontal pathway section 1, a second endless chain 28 is vertically stretched on the side close to the first horizontal pathway section 1 so as to pair with the vertical first endless chain 27 of the first lifting/lowering pathway section 3. In the second lifting/lowering pathway section 9, since the first endless chain 27 is vertically stretched on the side close to the first horizontal pathway section 1, a second endless chain 29 is vertically stretched on the side far from the first horizontal pathway section 1 so as to pair with the vertical first endless chain 27 of the second lifting/lowering pathway section 9. The horizontal interval between the vertical first endless chains 27 of the first lifting/lowering pathway section 3 and the second lifting/lowering pathway section 9 and the vertical second endless chains 28 and 29 which pair with the first endless chains 27 and which move in the same direction as the first endless chains 27 are equal to the interval between the engaged sections 16a and 16b and 17a and 17b which pair with each other in the forward and backward direction of the transporting cart 13 (hereinafter referred to as support intervals for the transporting cart 13).

The first endless chain 27 is stretched so as to start from a turning-section toothed wheel 30 which is pivotally supported by the sixth turning pathway section 11 through a turning-section toothed wheel 31 which is pivotally supported on the outer side of the first turning pathway section 2, a turning-section toothed wheel 32 which is pivotally supported on the inner side of the second turning pathway section 4, a turning-section toothed wheel 33 which is pivotally supported by the third turning pathway section 6, a turning-section toothed wheel 34 which is pivotally supported on the outer side of the fourth turning pathway section 8 and a turning-section toothed wheel 35 which is pivotally supported on the inner side of the fifth turning pathway section 10 then returns to the original turning-section toothed wheel 30; the second endless chain 28 is vertically stretched via a lower end guide toothed wheel 36 which is pivotally supported on the inner side of the first turning pathway section 2 and an upper end guide toothed wheel 37 which is pivotally supported on the outer side of the second turning pathway section 4; and the second endless chain 29 is vertically stretched via an upper end guide toothed wheel 38 which is pivotally supported on the inner side of the fourth turning pathway section 8 and a lower end guide toothed wheel 39 which is pivotally supported on the outer side of the fifth turning pathway section 10. In a turning section on the side of the upper end of the second endless chain 28, a take-up toothed wheel 40a and a plurality of guide toothed wheels 40b for guiding the second endless chain 28 thereto are also provided.

As shown in FIG. 3, in the respective pathway sections, various types of guide rails and the like are also provided which allow the transporting cart 13 to travel while keeping the horizontal upright posture. A schematic configuration will be described with reference to FIG. 3. Over the respective horizontal pathway sections 1, 5, 7 and 12, horizontal guide rails 41 to 44 for supporting and guiding the wheels 18a to 19b of the transporting cart 13 are laid. On the respective lifting/lowering pathway sections 3 and 9, front and rear pairs of vertical guide rails 45a and 45b and 46a and 46b which sandwich the wheels 18a and 19a on the front side of the transporting cart 13 that is lifted or lowered so as to prevent swinging and front and rear pairs of vertical guide rails 47a and 47b and 48a and 48b which sandwich the wheels 18b and 19b on the rear side so as to prevent swinging are laid. The sixth turning pathway section 11 and the third turning pathway section 6 have a front/rear symmetric structure, and a pair of left and right auxiliary rotating bodies 49 and 50 are respectively provided therein that are pivotally supported in positions which are separated outward and horizontally with respect to the turning-section toothed wheels 30 and 33 on the inner side and which are separated by only the support interval for the transporting cart 13 apart. Furthermore, in the lower end guide toothed wheel 36 which engages with the second endless chain 28 of the first turning pathway section 2, the upper end guide toothed wheel 37 which engages with the second endless chain 28 of the second turning pathway section 4 and the upper end guide toothed wheel 38 which engages with the second endless chain 29 of the fourth turning pathway section 8, auxiliary rotating bodies 51 to 53 are provided concentrically on the inner side thereof, and an auxiliary rotating body 54 is pivotally supported in a position which is separated outward from the turning-section toothed wheel 35 which engages with the first endless chain 27 of the fifth turning pathway section 10 and which is separated by only the support interval for the transporting cart apart.

All the endless chains 27 to 29 described above are stretched so as to be located on both the left and right sides of the traveling pathway of the transporting cart 13 and to form left and right pairs. Hence, all the toothed wheels 30 to 40b and the respective auxiliary rotating bodies 49 to 54 which engage with these endless chains are also concentrically and pivotally supported so as to be located on both the left and right sides of the traveling pathway of the transporting cart 13 and to form left and right pairs. Naturally, various types of guide rails, such as the horizontal guide rails 41 to 44 and the vertical guide rails 45a to 48b, which are provided in an auxiliary manner are also provided so as to be located on both the left and right sides of the transporting cart 13 and to form left and right pairs.

To the first endless chain 27, as shown in FIGS. 2A and 4 to 7, engagement sections 55 are attached at regular intervals equal to the support interval for the transporting cart 13. Each of the engagement sections 55 is formed with a member that has a concave section 56 to which the projection shafts 20a to 21b of the respective engaged sections 16a to 17b of the transporting cart 13 can be fitted so as to freely rotate relatively and to be detachably fitted, and in the first horizontal pathway section 1 and the second horizontal pathway section 5, the engagement sections 55 are provided on the inner side of the first endless chain 27 in such a direction that the concave sections 56 of the engagement sections 55 are open upward and that the projection shafts 20a to 21b of the respective engaged sections 16a to 17b of the transporting cart 13 can be fitted from above. The total length of the transporting cart 13 is slightly shorter than twice the length of the support interval for the transporting cart 13. Hence, as shown in FIG. 1, on the horizontal pathway sections 1, 5, 7 and 12, the respective transporting carts 13 can be engaged with the first endless chain 27 such that the respective transporting carts 13 are adjacent and continuous forward and backward via the respective engaged sections 16a to 17b of the transporting cart 13 and the respective engagement sections 55 of the first endless chain 27. In the respective second endless chains 28 and 29, as shown in FIGS. 8 to 12 and 18 to 22, engagement sections 57 and 58 are provided in a symmetric orientation at the same height as the respective engagement sections 55 of the first endless chain 27 aligned in parallel in the respective lifting/lowering pathway sections 3 and 9. It is a matter of course that the engagement sections 57 and 58 have the same structure as the engagement sections 55, and are formed with a member that has concave sections 59 and 60 to which the projection shafts 20a to 21b of the respective engaged sections 16a to 17b of the transporting cart 13 can be fitted.

The configuration of each of the turning pathway sections will be specifically described below. As shown in FIGS. 4 to 7 and 13 to 16, the sixth turning pathway section 11 and the third turning pathway section 6 have a front/rear symmetric structure, and the reference symbols of the third turning pathway section 6 are also provided by placing them in parentheses. The auxiliary rotating body 49 (50) has, on both sides in a diameter direction, engagement sections 49a and 49b (50a and 50b) that are formed with concave sections to which the projection shafts 20a to 21b of the respective engaged sections 16a to 17b of the transporting cart 13 can be fitted and that are directed outward; along the outer semicircular region of the rotation path of the auxiliary rotating body 49 (50), an outer semicircular guide rail 61 (62) is provided; an upper horizontal guide rail 63 (64) which has such a length so as to cover from the upper end of the outer semicircular guide rail 61 (62) to the end part region of a horizontal guide rail 41 (42) is continuously provided; and the lower end of the outer semicircular guide rail 61 (62) is connected to a horizontal guide rail 43 (44). In a center section in the left/right width direction below the turning-section toothed wheel 30 (33), a lower protruding cam 65 (66) which acts on the cam-following roller 25a (25b) on the bottom section of the transporting cart 13 and which has an arc-shaped cam surface is provided so as to locate below the movement path of the top plate 14 of the transporting cart 13 entering and exiting between the horizontal pathway section 12 (7) on the lower side and the turning pathway section 11 (6) and to protrude upward from the side of a floor surface.

Furthermore, over the side where the auxiliary rotating body 49 (50) is present with respect to the turning-section toothed wheel 30 (33), an intermediate guide rail 67 (68) is laid, and in the intermediate guide rail 67, an auxiliary horizontal guide rail section 67a (68a) at the same level as the horizontal guide rail 41 (42) of the horizontal pathway section 1 (5) and an arc-shaped guide rail section 67b (68b) along the turning-section toothed wheel 30 (33) are formed. On the outer semicircular guide rail 61 (62), the upper horizontal guide rail 63 (64) and the intermediate guide rail 67 (68), the wheels 18a to 19b of the engaged sections 16a to 17b on both the left and right sides of the transporting cart 13 are rolled and moved, and pairs of the left and right guide rails are provided so as to be located on both the left and right sides of the traveling pathway of the transporting cart 13, respectively. In a position adjacent to the turning-section toothed wheel 30 (33) of the horizontal guide rail 41 (42), an auxiliary support guide roller 69 (70) which supports both the left and right side plates 15a and 15b of the transporting cart 13 is pivotally supported.

Figure 13:
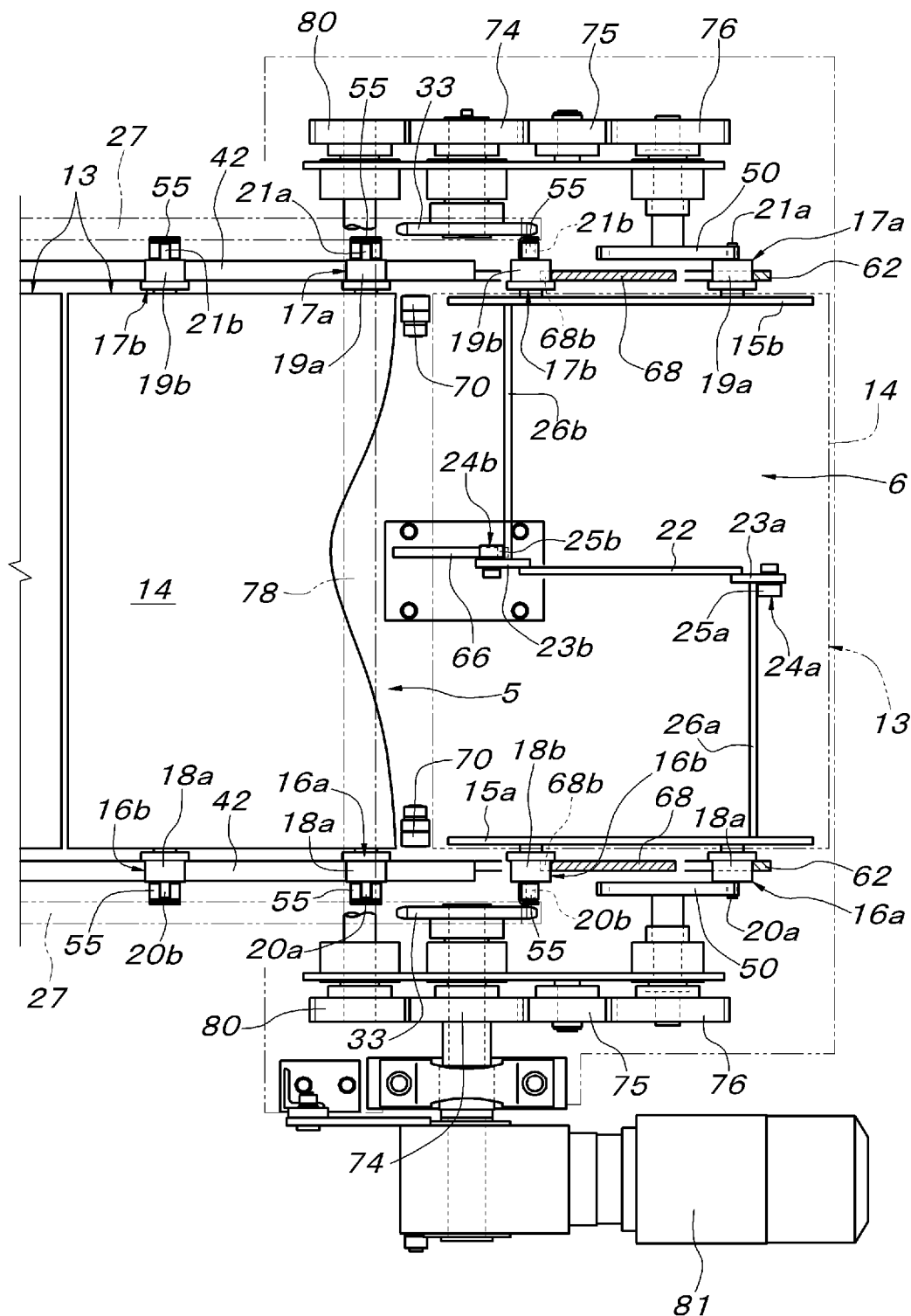
FIG. 13 is a partial cutaway plan view illustrating a third turning pathway section.
Figure 14:
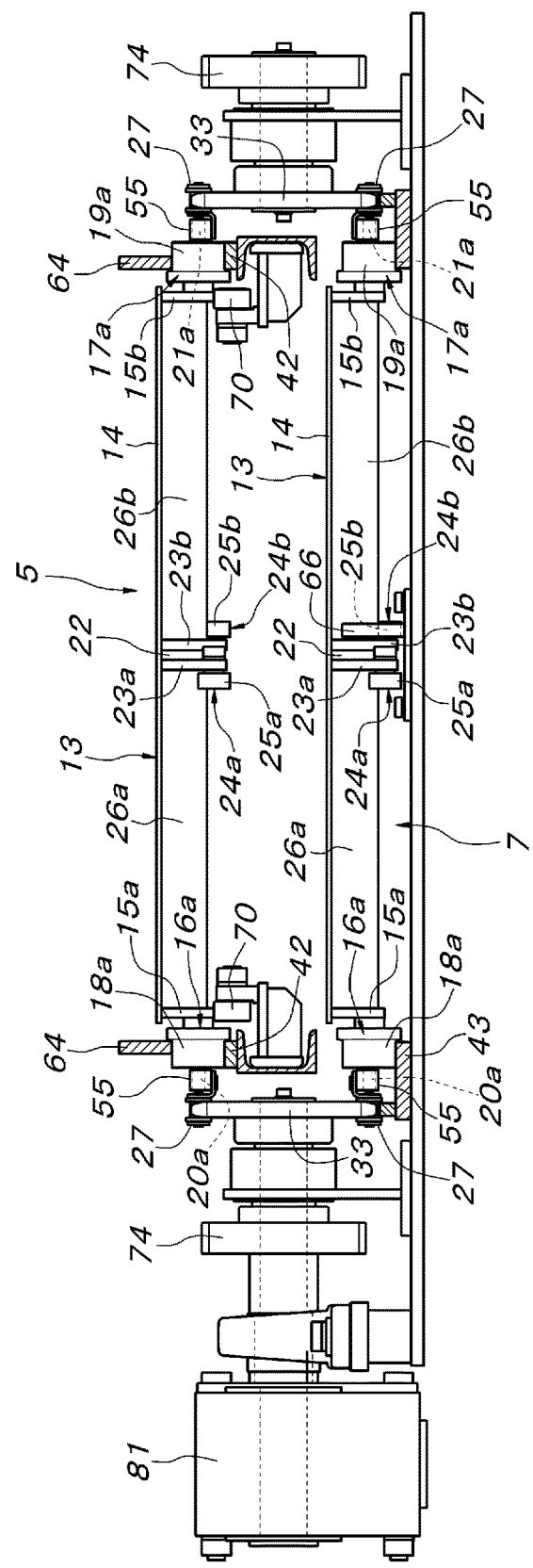
FIG. 14 is a vertical cross-sectional front view of an endless chain turning section in the third turning pathway section.
Figure 15A:
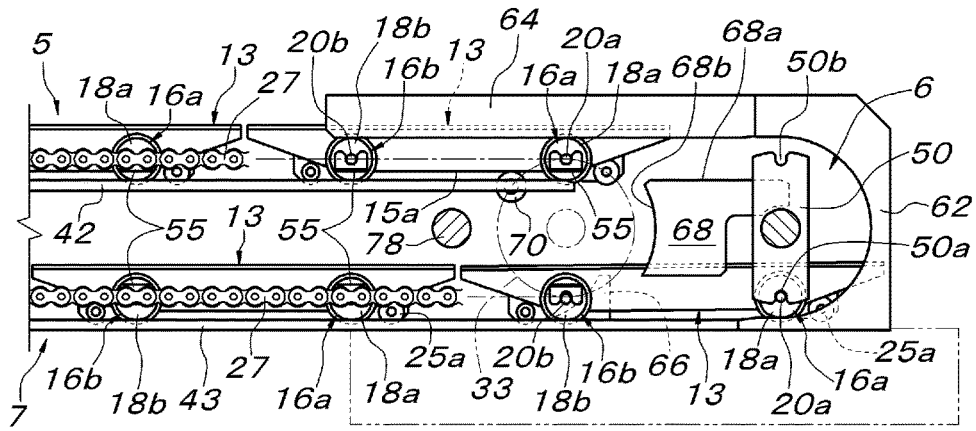
FIG. 15A is a side view of a first stage illustrating the travel of the transporting cart from the second horizontal pathway section through the third turning pathway section to a third horizontal pathway section.
Figure 15B:
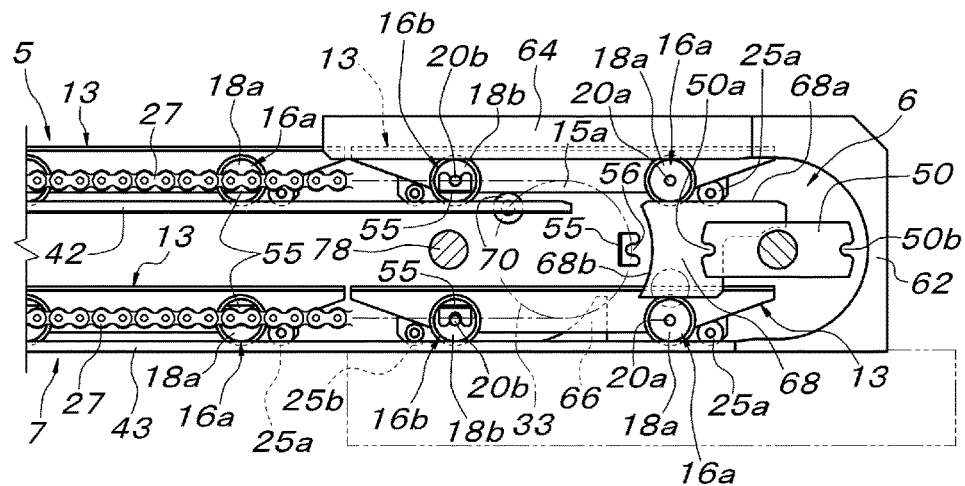
FIG. 15B is a side view of a second stage thereof.
Figure 15C:
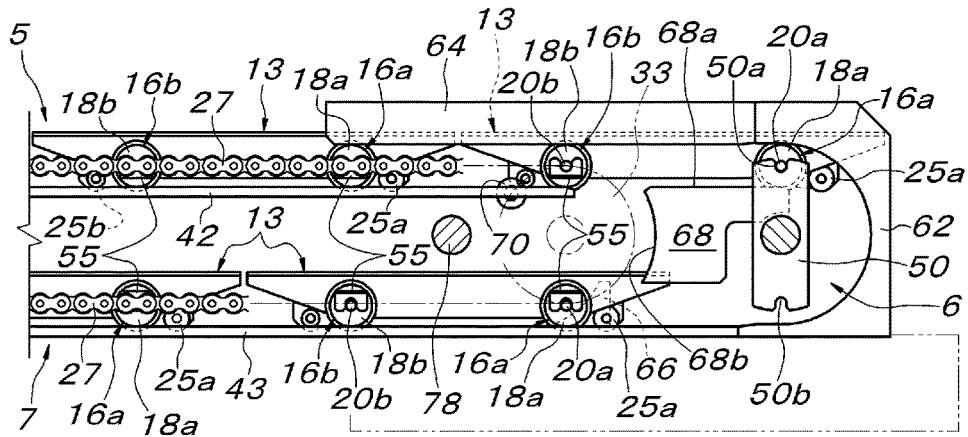
FIG. 15C is a side view of a third stage thereof.
Figure 16A:
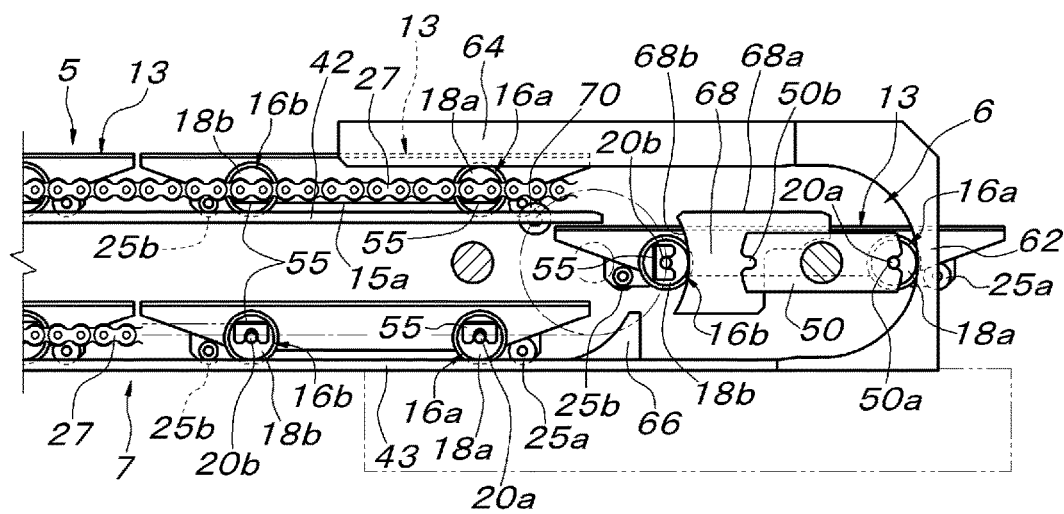
FIG. 16A is a side view of a fourth stage thereof.
Figure 16B:
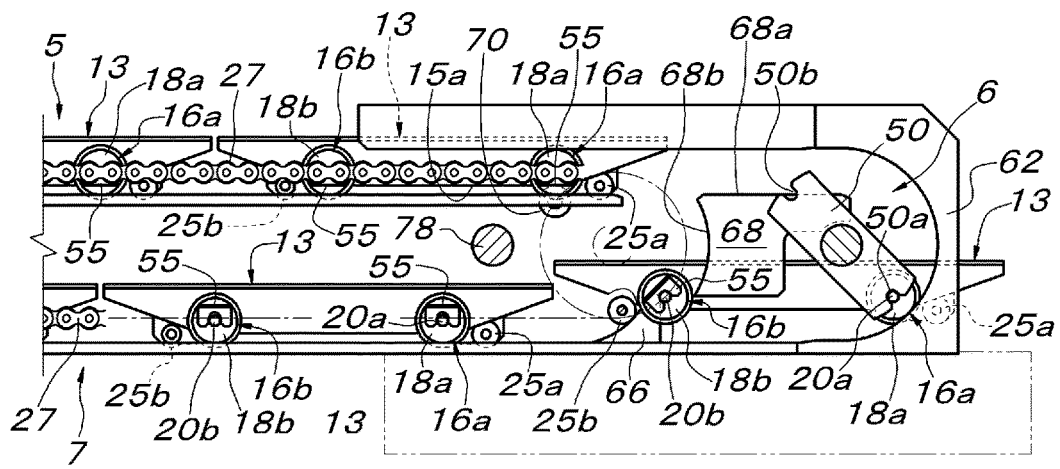
FIG. 16B is a side view of a fifth stage thereof.

The turning-section toothed wheel 30 (33) is driven to rotate by the engagement with the first endless chain 27; the turning-section toothed wheel 30 (33) and the auxiliary rotating body 49 (50) on the same left and right sides are coupled with spur gear trains 71 to 73 (74 to 76) in an interlocking manner so as to rotate at the same speed in the same direction as each other; and one transmission shaft 77 (78) and a spur gear 79 (80) meshing with one of the spur gear trains 71 to 73 (74 to 76) are provided such that the turning-section toothed wheel 30 (33) and the auxiliary rotating body 49 (50) on both the left and right sides rotate synchronously. The transmission shaft 77 (78) crosses between the first horizontal pathway section 1 (the second horizontal pathway section 5) and the fourth horizontal pathway section 12 (the third horizontal pathway section 7). Then, as shown in FIGS. 13 and 14, the support shaft of the turning-section toothed wheel 33 on one side of the pair of left and right turning-section toothed wheels 33 in the third turning pathway section 6 is extended outward and is directly connected to the output shaft of a speed reducer equipped motor 81 and the pair of left and right first endless chains 27 rotate at a constant speed by the operation of the speed reducer equipped motor 81 over all the traveling pathways.

The auxiliary rotating bodies 49a and 50 are positioned, outward of the turning-section toothed wheels 30 and 33, by only the support interval for the transporting cart 13 apart horizontally, and rotate in an interlocking manner in the same direction as the turning-section toothed wheels 30 and 33 via the gear mechanism described above; the rotation radius of the engagement sections 49a and 49b and 50a and 50b at both ends thereof is equal to the rotation radius of the engagement sections 55 of the first endless chain 27 which rotate around the turning-section toothed wheels 30 and 33; and when the engagement sections 49a and 49b and 50a and 50b at both ends thereof are present on a vertical axis passing through the rotation axial center, the two engagement sections 55 of the first endless chain 27 positioned at intervals equal to the support interval for the transporting cart 13 apart are also present on a vertical axis passing through the rotation axial center of the turning-section toothed wheels 30 and 33.

Figure 6A:
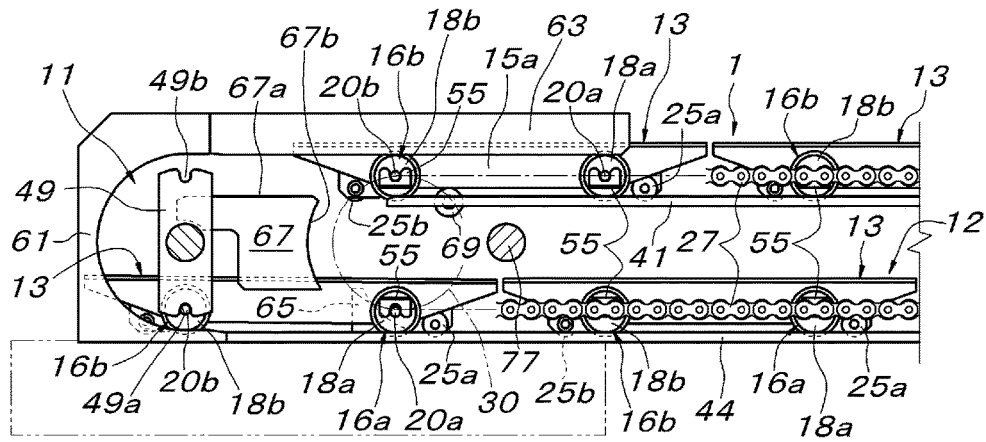
FIG. 6A is a side view of a first stage illustrating the travel of the transporting cart from a fourth horizontal pathway section through the sixth turning pathway section to the first horizontal pathway section.

In the fourth horizontal pathway section 12, the engagement sections 55 of the first endless chain 27 are downwardly fitted to the respective engaged sections 16a to 17b (the projection shafts 20a to 21b) of the transporting cart 13, the first endless chain 27 is driven by the speed reducer equipped motor 81 and thus the transporting cart 13 supported on the horizontal guide rail 44 via the wheels 18a to 19b can be made to travel horizontally toward the sixth turning pathway section 11. When the transporting cart 13 enters the sixth turning pathway section 11, as shown in FIG. 6A, as the engagement sections 55 rotate upward around the turning-section toothed wheel 30, the engaged sections 16b and 17b on the side of the advancing direction are separated from the engagement sections 55, are pushed from the rear to drive by the engagement sections 55 on the rear side as they are and are made to travel forward. Then, in the process in which the engaged sections 16b and 17b on the side of the advancing direction reach the position directly below the axial center of the auxiliary rotating body 49, the engagement section 49a at one end of the auxiliary rotating body 49 it fitted from above to the engaged sections 16b and 17b on the side of the advancing direction. Thereafter, by the rotation of the turning-section toothed wheel 30 and the auxiliary rotating body 49, the engaged sections 16b and 17b on the side of the advancing direction in the transporting cart 13 are scooped upward by the auxiliary rotating body 49, and simultaneously the engaged sections 16b and 17b on the rear side of the transporting cart 13 are scooped upward synchronously by the engagement sections 55 which rotate around the turning-section toothed wheel 30.

Figure 6B:
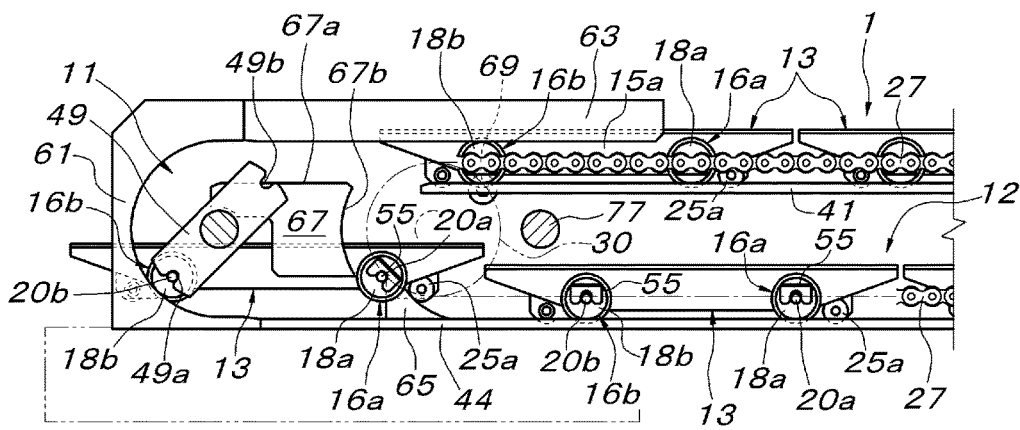
FIG. 6B is a side view of a second stage thereof.

Although at the time of the operation of scooping up the transporting cart 13 described above, from the vertically downward engagement section 49a of the auxiliary rotating body 49 and the vertically downward engagement sections 55 of the first endless chain 27, the engaged sections 16a to 17b of the transporting cart 13 which are respectively fitted thereto tend to be pushed out forward as shown in FIG. 6B, the engaged sections 16b and 17b on the front side are scooped upward by the rotation of the engagement section 49a of the auxiliary rotating body 49 along the outer semicircular guide rail 61 in a state where the engaged sections 16b and 17b are received by the outer semicircular guide rail 61. On the other hand, when the engaged sections 16a and 17a on the rear side of the transporting cart 13 reach the position directly below the rotation axial center of the turning-section toothed wheel 30, since the cam-following roller 25a of the auxiliary supported section 24a located on the rear side of the bottom section of the transporting cart 13 has reached the area directly in front of the lower protruding cam 65, as the transporting cart 13 is scooped up from such a state as described above, the cam-following roller 25a moves upward along the arc-shaped cam surface of the lower protruding cam 65. In other words, the engaged sections 16a and 17a on the rear side are prevented from being pushed out forward from the engagement sections 55 of the first endless chain 27 by the lower protruding cam 65 via the cam-following roller 25a, and thus the transporting cart 13 is reliably scooped up to the upward in a state of being supported horizontally by the engagement section 49a of the auxiliary rotating body 49 and the engagement sections 55 of the first endless chain 27 which rotate at the same level.

Although in the process in which the cam-following roller 25a of the auxiliary supported section 24a located on the rear side of the bottom section of the transporting cart 13 reaches the lower protruding cam 65, the transporting cart 13 needs to pass forward through the position of the lower protruding cam 65, since the space below the top plate 14 in front of the cam-following roller 25a is opened forward at this time, when the height of the lower protruding cam 65 is lower than the height of the bottom surface of the top plate 14, the transporting cart 13 can travel on the lower protruding cam 65 without interfering with each other. At this time, the cam-following roller 25b of the auxiliary supported section 24b on the front side moves through the position on the lateral side of the lower protruding cam 65.

Figure 6C:
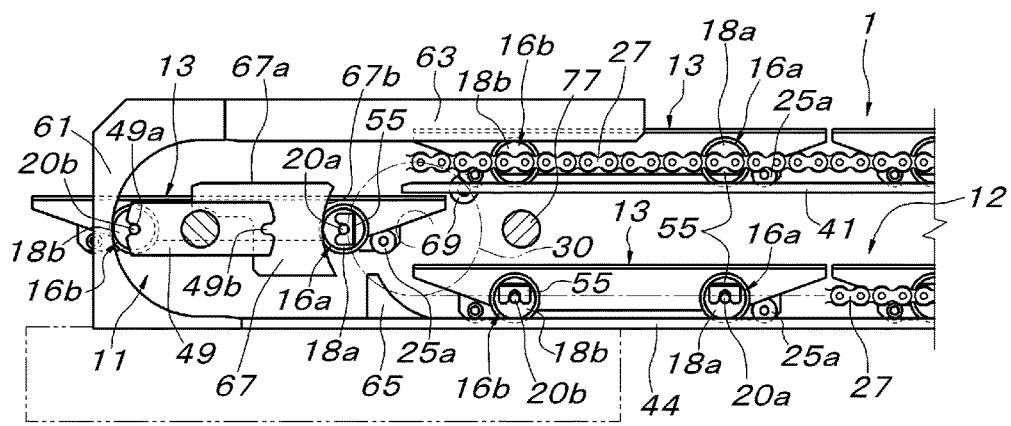
FIG. 6C is a side view of a third stage thereof.

When the cam-following roller 25a of the auxiliary supported section 24a located on the rear side of the bottom section of the transporting cart 13 passes over the upper end of the lower protruding cam 65, as shown in FIG. 6C, since the wheels 18a and 19a of the engaged sections 16a and 17a on the rear side of the transporting cart 13 are in a state of moving upward along the arc-shaped guide rail section 67b of the intermediate guide rail 67, in a state where both the front and rear wheels 18a to 19b of the transporting cart 13 are along the outer semicircular guide rail 61 and the arc-shaped guide rail section 67b of the intermediate guide rail 67, the transporting cart 13 is reliably scooped up by the engagement section 49a of the auxiliary rotating bodies 49 and the engagement sections 55 of the first endless chain 27 up to the level of the first horizontal pathway section 1 while keeping a horizontal posture. When the cam-following roller 25a of the transporting cart 13 passes over the upper end of the lower protruding cam 65, the engagement sections 55 of the first endless chain 27 fitted to the engaged sections 16a and 17a (the projection shafts 20a and 21a) on the rear side of the transporting cart 13 rotate upward to an angle close to the forward and horizontal direction and thereby can support the rear side of the transporting cart 13 via the engaged sections 16a and 17a, and moreover, the transporting cart 13 is not pushed out forward by the outer semicircular guide rail 61, with the result that the arc-shaped guide rail section 67b of the intermediate guide rail 67 is not essential.

Figure 7A:
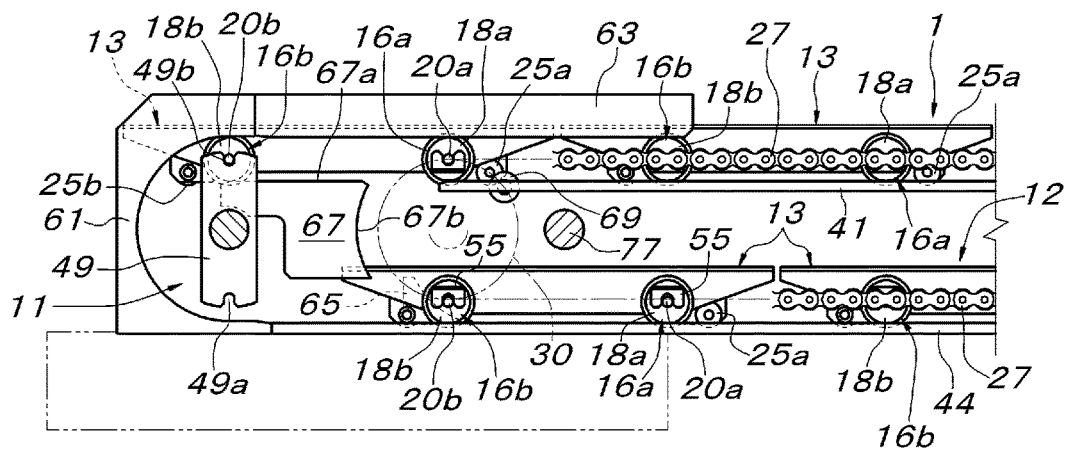
FIG. 7A is a side view of a fourth stage thereof.

As shown in FIG. 7A, the engagement section 49a of the auxiliary rotating body 49 and the engagement sections 55 of the first endless chain 27 individually reach the positions directly above the rotation axial centers, and thus the process of scooping up the transporting cart 13 described above is completed, and at this time, the wheels 18a and 19a on the side of the advancing direction of the transporting cart 13 reach the top of the horizontal guide rail 41 in the first horizontal pathway section 1, and the wheels 18b and 19b on the rear side of the transporting cart 13 reach the top of the auxiliary horizontal guide rail section 67a of the intermediate guide rail 67. Hence, the wheels 18a and 19a on the side of the advancing direction of the transporting cart 13 are sent into the first horizontal pathway section 1 in a state where the projection shafts 20a and 21a remain to be fitted to the engagement sections 55 of the first endless chain 27 which are separated from the turning-section toothed wheel 30 and which move forward parallel to the first horizontal pathway section 1, accordingly, the projection shafts 20b and 21b of the engaged sections 16b and 17b on the rear side of the transporting cart 13 are separated from the engagement section 49a of the auxiliary rotating body 49 and the transporting cart 13 travels horizontally and is sent into the first horizontal pathway section 1 while the wheels 18b and 19b rolling on the auxiliary horizontal guide rail section 67a of the intermediate guide rail 67.

Figure 7B:
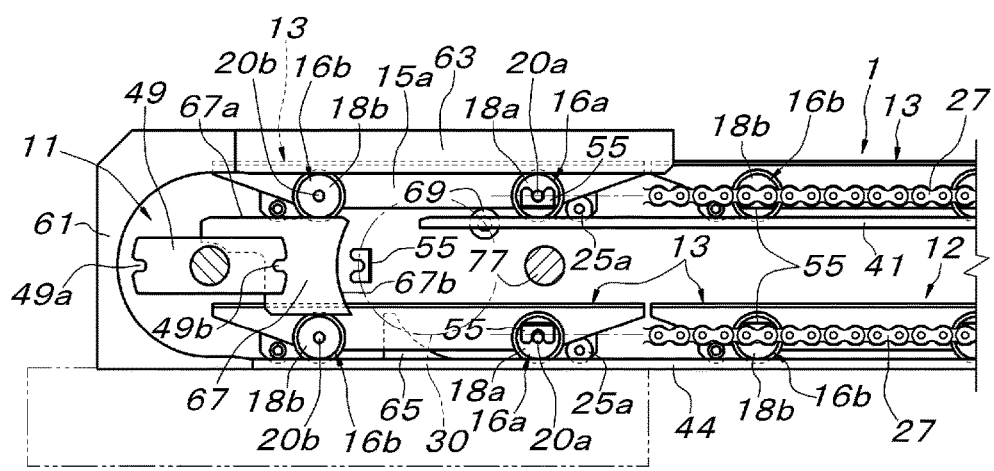
FIG. 7B is a side view of a fifth stage thereof.

Since between the auxiliary horizontal guide rail section 67a of the intermediate guide rail 67 and the horizontal guide rail 41 of the first horizontal pathway section 1, the space is present for the engagement sections 55 of the first endless chain 27 rotating around the turning-section toothed wheel 30 to pass through, when the wheels 18b and 19b on the rear side of the transporting cart 13 are separated forward from the top of the auxiliary horizontal guide rail section 67a of the intermediate guide rail 67, it is considered that the wheels 18b and 19b on the rear side drop between the auxiliary horizontal guide rail section 67a and the horizontal guide rail 41 of the first horizontal pathway section 1. However, when this state is brought about, as shown in FIG. 7B, both the left and right side plates 15a and 15b of the transporting cart 13 are supported by the auxiliary support guide roller 69 behind the wheels 18a and 19a on the side of the advancing direction, and the tops of the wheels 18a and 19a on the side of the advancing direction are covered by the upper horizontal guide rail 63. Hence, while the barycentric position of the transporting cart 13 is located behind the position where the transporting cart 13 is supported by the auxiliary support guide roller 69, the transporting cart 13 is prevented from inclining, with the auxiliary support guide roller 69 being its fulcrum in a direction in which the wheels 18a and 19a on the rear side drop, by the upper horizontal guide rail 63 via the wheels 18a and 19a on the side of the advancing direction. Whereas, in a state where, when the transporting cart 13 further travels and thus the barycentric position of the transporting cart 13 has moved forward beyond the position where the transporting cart 13 is supported by the auxiliary support guide roller 69, the transporting cart 13 can be prevented from inclining, with the wheels 18a and 19a on the side of the advancing direction being its fulcrum in the direction in which the wheels 18a and 19a on the rear side drop, by the auxiliary support guide roller 69.

When the wheels 18b and 19b on the rear side of the transporting cart 13 reach the position directly above the turning-section toothed wheel 30, as shown in FIG. 6A, the empty engagement sections 55 which rotate upward around the turning-section toothed wheel 30, that is, the empty engagement sections 55 which are separated from the engaged sections 16b and 17b on the side of the advancing direction and which rotate upward around the turning-section toothed wheel 30 in the transporting cart 13 subsequent to the transporting cart which is scooped up from the fourth horizontal pathway section 12 to the first horizontal pathway section 1 are fitted to the projection shafts 20b and 21b of the engaged sections 16b and 17b on the rear side of the transporting cart 13 that is sent into the first horizontal pathway section 1 as described above. Hence, in the transporting cart 13 sent into the first horizontal pathway section 1, all the projection shafts 20a to 21b of the engaged sections 16a to 17b are fitted to the respective engagement sections 55 adjacent forward and backward to the first endless chain 27, and the transporting cart 13 is driven to travel toward the next, first turning pathway section 2 in the horizontal posture in a state where all the wheels 18a to 19b are supported on the horizontal guide rail 41.

In the third turning pathway section 6 having a symmetric structure with respect to the sixth turning pathway section 11 described above, as shown in FIGS. 15A to 16B, the same action as when in the sixth turning pathway section 11, the first endless chain 27 is reversely rotated so as to move from the first horizontal pathway section 1 to the fourth horizontal pathway section 12 is performed. That is, in the transporting cart 13 which is made to travel by the first endless chain 27 from the second horizontal pathway section 5 through the third turning pathway section 6 to the third horizontal pathway section 7, the wheels 18a and 19a on the front side can be prevented from dropping between the horizontal guide rail 42 and the auxiliary horizontal guide rail section 68a of the intermediate guide rail 68 by the upper horizontal guide rail 64 and the auxiliary support guide roller 70. Then, immediately before the completion of the turning of the transporting cart 13 downward, that is, when the projection shafts 20b and 21b of the engaged sections 16b and 17b on the rear side are no longer supported by the engagement sections 55 of the first endless chain 27 which incline obliquely downward with respect to the forward direction, the cam-following roller 25b of the auxiliary supported section 24b on the rear side of the bottom section of the transporting cart 13 is supported and guided by the lower protruding cam 66, and thus the transporting cart 13 can be reliably and smoothly turned while keeping the horizontal upright posture until the wheels 18b and 19b on the rear side of the transporting cart 13 reach the top of the horizontal guide rail 43. Since the third turning pathway section 6 has the symmetric structure with respect to the sixth turning pathway section 11, by reversely rotating the first endless chain 27, the transporting cart 13 can be made to travel from the third horizontal pathway section 7 through the third turning pathway section 6 to the second horizontal pathway section 5 while keeping the horizontal upright posture.

Figure 8:
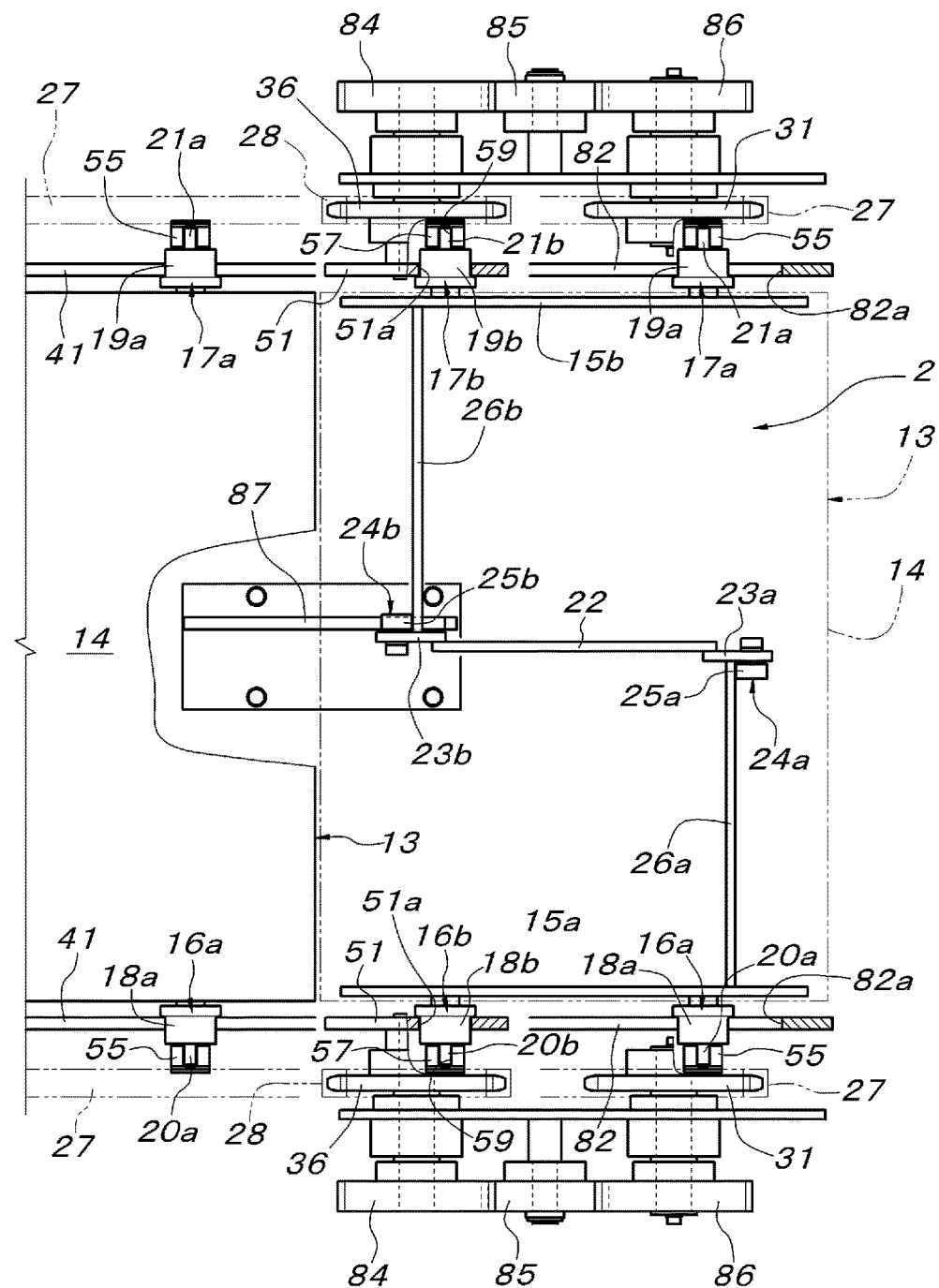
FIG. 8 is a partial cutaway plan view illustrating a first turning pathway section.

The configuration and action of the second turning pathway section 4 will next be described with reference to FIGS. 8 and 9. Since the lower end guide toothed wheel 36 at the lower end of the second endless chain 28 of the first lifting/lowering pathway section 3 on the second turning pathway section 4 is positioned directly above the first endless chain 27 which moves along the first horizontal pathway section 1, the lower end guide toothed wheel 36 needs to be pivotally supported separately upward from the first endless chain 27 which moves along the first horizontal pathway section 1 in order to prevent the engagement sections 57 of the second endless chain 28 rotating around the lower end guide toothed wheel 36 and the engagement sections 55 of the first endless chain 27 moving along the first horizontal pathway section 1 from interfering with each other. On the other hand, although the first endless chain 27 is lifted through the turning-section toothed wheel 31 to the first lifting/lowering pathway section 3, since the turning-section toothed wheel 31 needs to be pivotally supported at the same level as the lower end guide toothed wheel 36 of the second endless chain 28, the first endless chain 27 which passes through below the lower end guide toothed wheel 36 is inclined upward toward the turning-section toothed wheel 31. In order to move the engaged sections 16a and 17a in the advancing direction of the transporting cart 13 along the upward gradient of the first endless chain 27, a pair of left and right lower inclined guide rails 82 for supporting and guiding the wheels 18a and 19a of the engaged sections 16a and 17a are laid.

The upper end part of the lower inclined guide rail 82 includes an arc-shaped rail section 82a which is formed in the shape of an arc concentrically with the turning-section toothed wheel 31, and the lower end of the vertical guide rail 45a on the outer side of the vertical guide rails 45a and 45b which sandwich the moving pathway of the first endless chain 27 in the first lifting/lowering pathway section 3 is connected to the arc-shaped rail section 82a. On the other hand, the lower end part of the vertical guide rail 46a on the side of the first endless chain 27 of the vertical guide rails 46a and 46b which sandwich the moving pathway of the second endless chain 28 and the lower end part of the vertical guide rail 45b on the inner side of the vertical guide rails 45a and 45b are integrated with a coupling plate member 83; in the coupling plate member 83, an arc-shaped rail section 83a which sandwiches the wheels 18a and 19a of the engaged sections 16a and 17a rotating around the turning-section toothed wheel 31 with the arc-shaped rail section 82a of the lower inclined guide rail 82 and which guides the wheels 18a and 19a and an arc-shaped rail section 83b which guides the wheels 18b and 19b of the engaged sections 16b and 17b on the rear side of the transporting cart 13 that move up around the lower end guide toothed wheel 36 of the second endless chain 28 are formed.

On the inner side of the lower end guide toothed wheel 36 of the second endless chain 28, the circular-plate-shaped auxiliary rotating body 51 whose radius is substantially equal to the rotation radius of the engagement section 57 of the second endless chain 28 rotating around the lower end guide toothed wheel 36 is continuously provided so as to rotate integrally; on both sides in the diameter direction around the auxiliary rotating body 51, engagement sections 51a and 51b which are formed with concave sections that are fitted to the wheels 18b and 19b on the rear side of the transporting cart 13 are provided so as to overlap the engagement section 57 of the second endless chain 28. The turning-section toothed wheel 31 of the first endless chain 27 and the auxiliary rotating body 51 are aligned in parallel at intervals equal to the support interval for the transporting cart 13 apart horizontally, and the turning-section toothed wheel 31, the lower end guide toothed wheel 36 of the second endless chain 28 and the auxiliary rotating body 51 which are driven to rotate by the engagement with the first endless chain 27 are coupled by spur gear trains 84, 85 and 86 in an interlocking manner so as to rotate at the same speed in the same direction. Furthermore, in an intermediate lower position of the pair of left and right lower end guide toothed wheels 36 (the auxiliary rotating bodies 51) in the second endless chain 28, a lower protruding cam 87 which acts on the cam-following roller 25b of the auxiliary supported section 24b on the rear side of the transporting cart 13 is provided so as to protrude. The lower protruding cam 87 has the same height as the lower protruding cams 65 and 66 which are arranged in the sixth turning pathway section 11 (the third turning pathway section 6), and has the same shape as a portion which is obtained by cutting the arc-shaped rail section 82a at the upper end of the lower inclined guide rail 82 at the same height as the upper end of the lower protruding cam 87.

In the second turning pathway section 4 configured as described above, when the transporting cart 13 traveling horizontally on the first horizontal pathway section 1 with the first endless chain 27 reaches the second turning pathway section 4, the wheels 18a and 19a of the engaged sections 16a and 17a on the front side which engage with the engagement sections 55 of the first endless chain 27 are guided by the lower inclined guide rail 82 and are thereby moved obliquely forward, and when the wheels 18a and 19a enter the top of the lower inclined guide rail 82, the lower protruding cam 87 is arranged such that the cam-following roller 25b of the auxiliary supported section 24b on the rear side of the bottom section of the transporting cart 13 enters the top of the lower protruding cam 87. Hence, the transporting cart 13 is guided by the lower inclined guide rail 82 and the lower protruding cam 87 so as to travel obliquely upward with respect to the forward direction while keeping the horizontal posture.

Figure 9A:
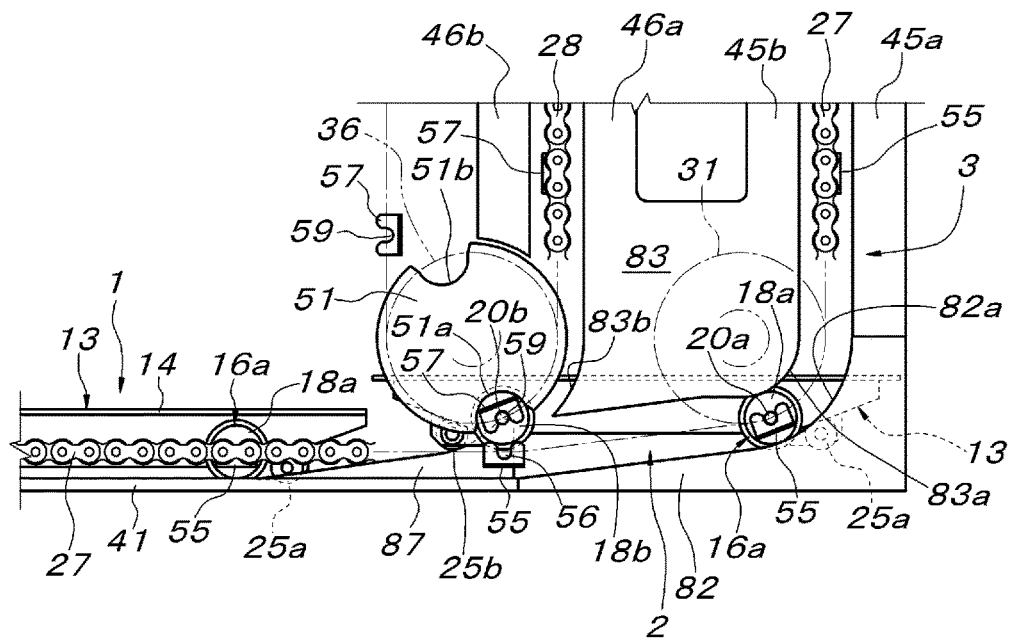
FIG. 9A is a side view of a first stage illustrating the travel of the transporting cart from the first horizontal pathway section through the first turning pathway section to a first lifting/lowering pathway section.
Figure 9B:
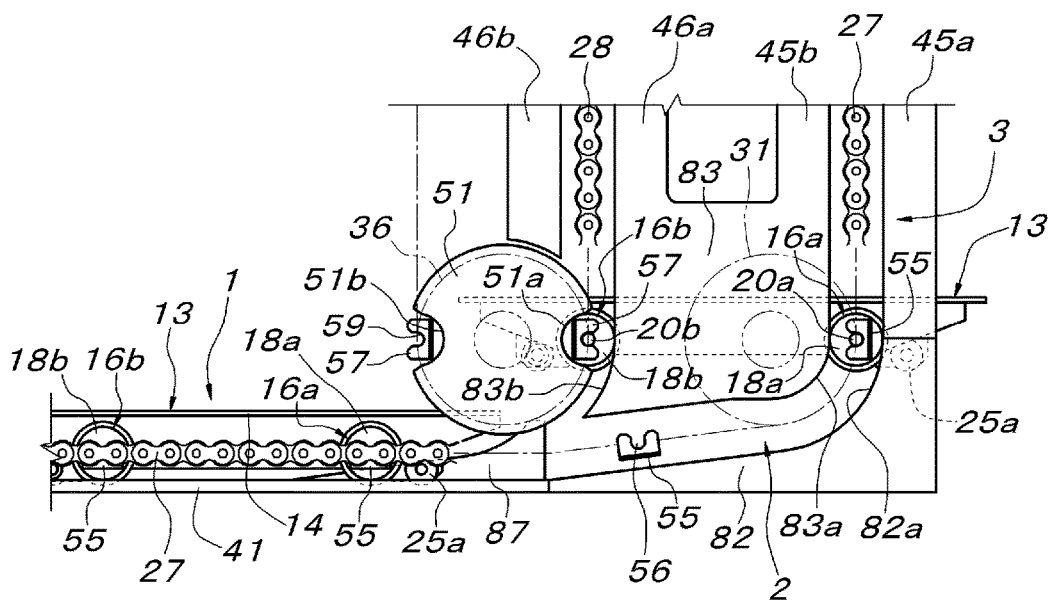
FIG. 9B is a side view of a second stage thereof.

When the front and rear engaged sections 16a to 17b of the transporting cart 13 reach the respective positions directly below the turning-section toothed wheel 31 of the first endless chain 27 and the lower end guide toothed wheel 36 (the auxiliary rotating body 51) of the second endless chain 28, the one engagement section 51a of the pair of left and right auxiliary rotating bodies 51 interlocking with the first endless chain 27 is fitted from above to the wheels 18b and 19b of the engaged sections 16b and 17b on the rear side of the transporting cart 13, and as shown in FIG. 9A, in synchronization with the scooping-up of the wheels 18a and 19a of the engaged sections 16a and 17a on the front side along the arc-shaped rail section 82a of the lower inclined guide rails 82, the wheels 18b and 19b of the rear-side engaged sections 16b and 17b are scooped up by the engagement section 51a of the auxiliary rotating body 51. At this time, the wheels 18b and 19b scooped up by the engagement section 51a of the auxiliary rotating body 51 enter the inner side of the arc-shaped rail section 83b of the coupling plate member 83, and thus the wheels 18b and 19b are prevented from being disengaged from the engagement section 51a of the auxiliary rotating body 51.

As described above, as shown in FIG. 9B, after the front and rear engaged sections 16a to 17b of the transporting cart 13 are scooped up to the respective heights directly beside the turning-section toothed wheel 31 of the first endless chain 27 and the lower end guide toothed wheel 36 (the auxiliary rotating body 51) of the second endless chain 28, the projection shafts 20a and 21a of the engaged sections 16a and 17a on the front side of the transporting cart 13 are lifted by the engagement section 55 of the first endless chain 27, the wheels 18a and 19a on the front side move up between the pair of front and rear vertical guide rails 45a and 45b, the projection shafts 20b and 21b of the engaged sections 16b and 17b on the rear side of the transporting cart 13 are lifted by the engagement section 57 of the second endless chain 28 and the wheels 18b and 19b on the rear side move up between the pair of front and rear vertical guide rails 46a and 46b, with the result that the transporting cart 13 moves up along the first lifting/lowering pathway section 3 while keeping the horizontal upright posture.

Figure 10:
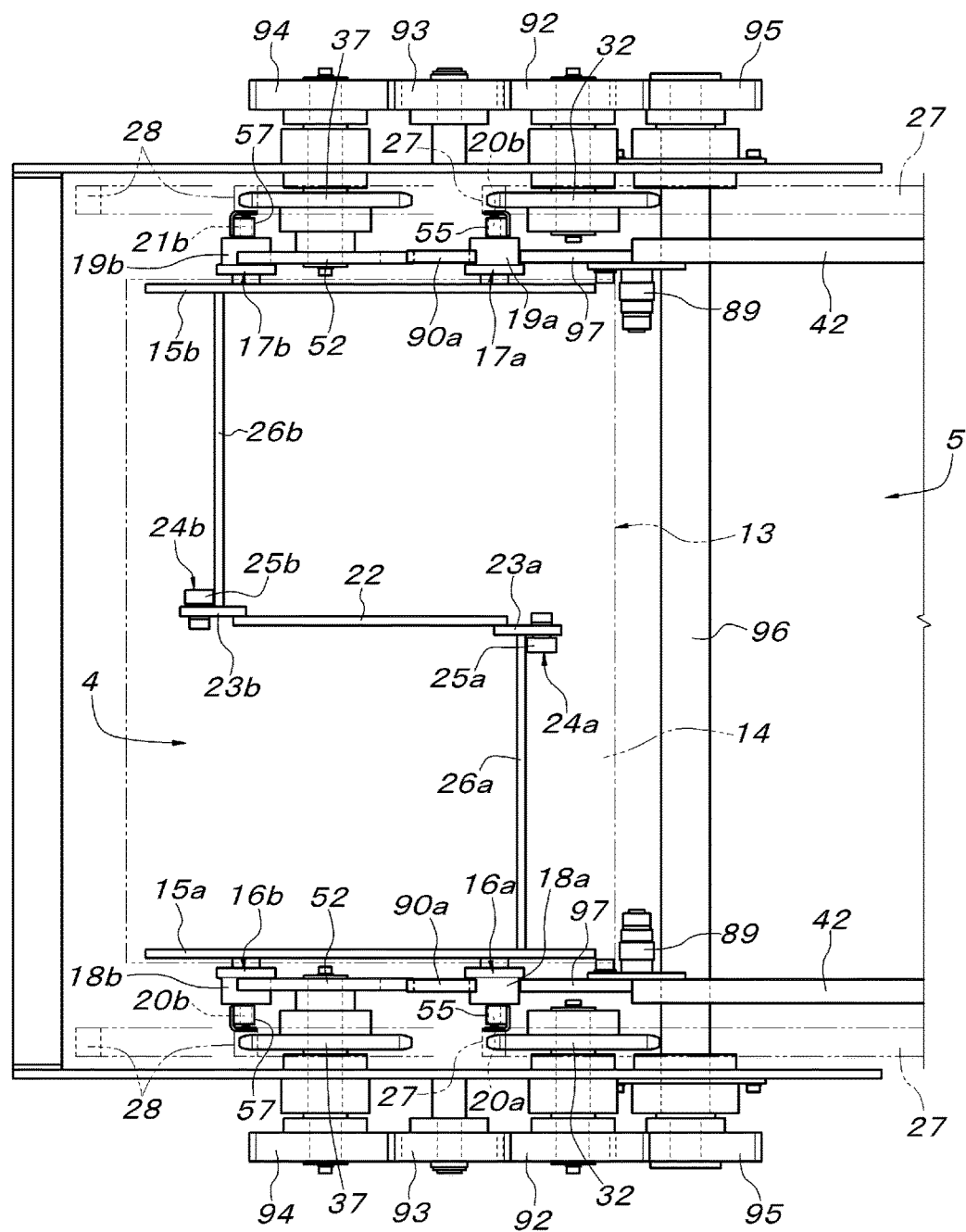
FIG. 10 is a partial cutaway plan view illustrating a second turning pathway section.
Figure 11:
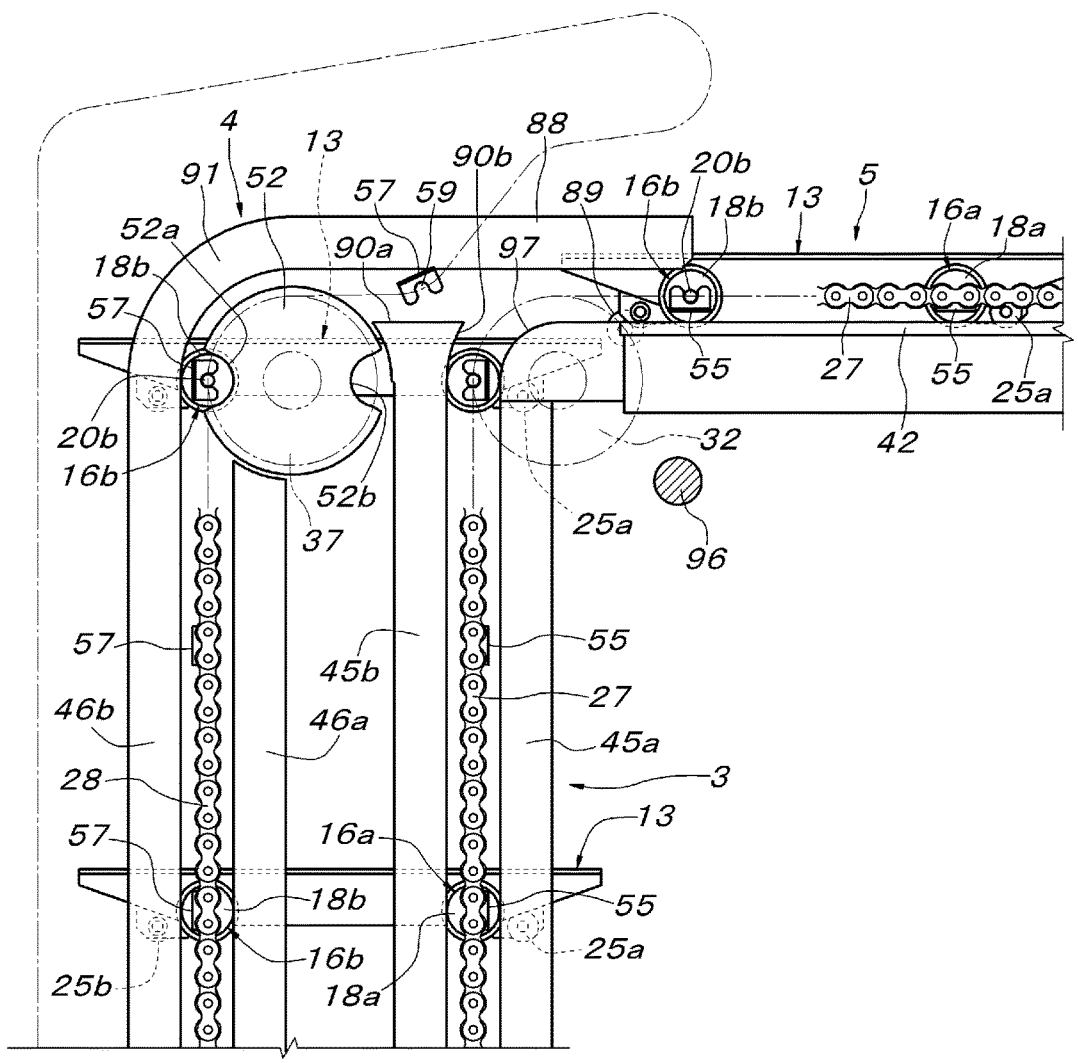
FIG. 11 is a side view of a first stage illustrating the travel of the transporting cart from the first lifting/lowering pathway section through the second turning pathway section to a second horizontal pathway section.

The transporting cart 13 which moves up along the first lifting/lowering pathway section 3 travels from the first lifting/lowering pathway section 3 through the second turning pathway section 4 to the high-position second horizontal pathway section 5, and the configuration and action of the second turning pathway section 4 will next be described. As shown in FIGS. 10 to 12, on the inner side of the pair of left and right upper end guide toothed wheels 37 of the second endless chain 28 which are pivotally supported and which are separated by only the interval equal to the support interval for the transporting cart 13 apart backward from the turning-section toothed wheel 32 of the first endless chain 27, the auxiliary rotating body 52 having the same structure as the auxiliary rotating body 51 provided integrally with the lower end guide toothed wheel 36 of the first turning pathway section 2 is continuously provided so as to rotate integrally in a state where engagement sections 52a and 52b thereof overlap the engagement section 57 of the second endless chain 28.

An upper horizontal guide rail 88 which corresponds to the upper horizontal guide rail 63 provided in the sixth turning pathway section 11, an auxiliary support guide roller 89 which corresponds to the auxiliary support guide roller 69 provided in the sixth turning pathway section 11, an auxiliary horizontal guide rail section 90a which corresponds to the auxiliary horizontal guide rail section 67a of the intermediate guide rail 67 provided in the sixth turning pathway section 11 and an arc-shaped guide rail section 90b which corresponds to the upper half portion of the arc-shaped guide rail section 67b of the intermediate guide rail 67 provided in the sixth turning pathway section 11 are respectively provided; an outer arc-shaped guide rail 91 is also provided which connects the upper end of the vertical guide rail 46b on the outer side of the second endless chain 28 and the upper horizontal guide rail 88 and which is concentric with the upper end guide toothed wheel 37 of the second endless chain 28. The auxiliary horizontal guide rail section 90a and the arc-shaped guide rail section 90b are formed at the upper end of the vertical guide rail 45b on the outer side of the first endless chain 27. The upper end of the vertical guide rail 45a on the inner side of the first endless chain 27 is connected to the horizontal guide rail 42 of the second horizontal pathway section 5 via an inner arc-shaped guide rail 97 which is concentric with the turning-section toothed wheel 32.

As in the configuration of the sixth turning pathway section 11, as shown in FIG. 10, the pair of left and right upper end guide toothed wheels 37 which guide the second endless chain 28 of the second turning pathway section 4 and the pair of left and right turning-section toothed wheels 32 which engage with the first endless chain 27 are coupled in an interlocking manner with spur gear trains 92 to 94 for each of the left and right, and are coupled to each other in an interlocking manner with one transmission shaft 96 which has spur gears 95 at both ends. The transmission shaft 96 crosses on the lower side of the second horizontal pathway section 5. The second endless chain 28 which is extended through the upper end guide toothed wheel 37 returns through the guide toothed wheel 40b and the take-up toothed wheel 40a toward the lower end guide toothed wheel 36 at the lower end of the first lifting/lowering pathway section 3, and the position in which the engagement section 57 of the second endless chain 28 is separated upward from the projection shafts 20b and 21b of the engaged sections 16b and 17b on the rear side of the transporting cart 13 is the position in which the projection shafts 20b and 21b of the engaged sections 16b and 17b reach the top of the auxiliary horizontal guide rail section 90a.

Figure 12A:
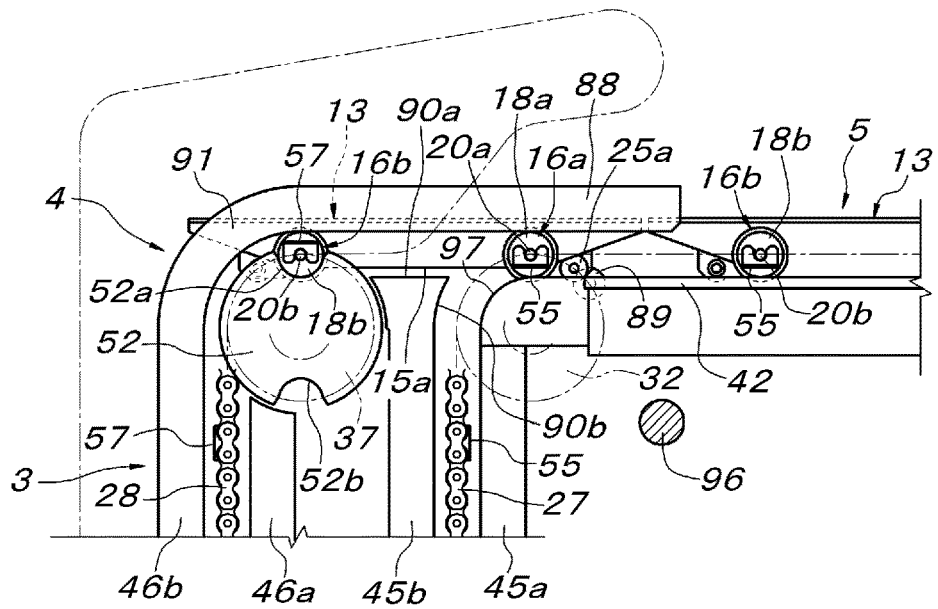
FIG. 12A is a side view of a second stage thereof.
Figure 12B:
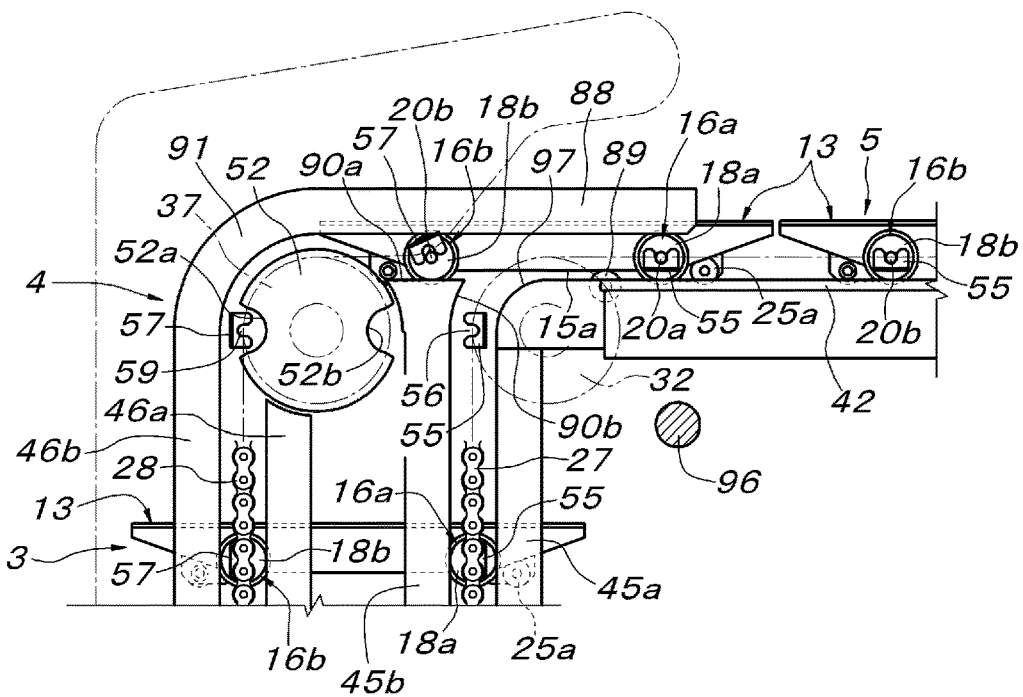
FIG. 12B is a side view of a third stage thereof.

In the configuration of the second turning pathway section 4 configured as described above, when the transporting cart 13 which moves up along the first lifting/lowering pathway section 3 reaches the height of the axial centers of the auxiliary rotating body 52 of the second turning pathway section 4 and the turning-section toothed wheel 32 of the first endless chain 27, as shown in FIG. 11, the wheels 18b and 19b of the engaged sections 16b and 17b on the rear side of the transporting cart 13 are fitted to the engagement section 52a of the auxiliary rotating body 52. Thereafter, by the rotation of the auxiliary rotating body 52 and the turning-section toothed wheel 32, as shown in FIGS. 12A and 12B, the wheels 18a and 19a of the engaged sections 16a and 17a on the front side fitted to the engagement section 55 of the first endless chain 27 are sent into the top of the second horizontal pathway section 5 through the top of the inner arc-shaped guide rail 97, and the wheels 18b and 19b of the engaged sections 16b and 17b on the rear side are separated from the engagement section 52a of the auxiliary rotating body 52 and are transferred to the top of the auxiliary horizontal guide rail section 90a. At this time, the engagement section 57 of the second endless chain 28 fitted to the projection shafts 20b and 21b of the engaged sections 16b and 17b on the rear side is separated in a position on the upper side of the auxiliary horizontal guide rail section 90a obliquely upward from the projection shafts 20b and 21b. Thereafter, by the engagement section 55 of the first endless chain 27, the transporting cart 13 is sent into the second horizontal pathway section 5 via the projection shafts 20a and 21a of the engaged sections 16a and 17a on the front side. In this process, the engagement section 55 of the first endless chain 27 rotating around the turning-section toothed wheel 32 is fitted to the projection shafts 20b and 21b of the engaged sections 16b and 17b on the rear side of the transporting cart 13. In this way, the transporting cart 13 is sent from the first lifting/lowering pathway section 3 through the second turning pathway section 4 into the second horizontal pathway section 5 while keeping the horizontal upright posture.

Within the second horizontal pathway section 5, the transporting cart 13 is driven to travel horizontally on the horizontal guide rail 42 by the engagement sections 55 of the first endless chain 27 fitted to the projection shafts 20a to 21b of the front and rear engaged sections 16a to 17b in the transporting cart 13. Then, the transporting cart 13 which has reached the third turning pathway section 6 makes a U-turn by the action previously described on the third turning pathway section 6 while keeping the horizontal upright posture into the third horizontal pathway section 7, and is driven to travel the third horizontal pathway section 7 to the side of the fourth turning pathway section 8 by the first endless chain 27. Then, the transporting cart 13 is sent into the second lifting/lowering pathway section 9 through the fourth turning pathway section 8, and the configuration and action of the fourth turning pathway section 8 will next be described.

Figure 17:
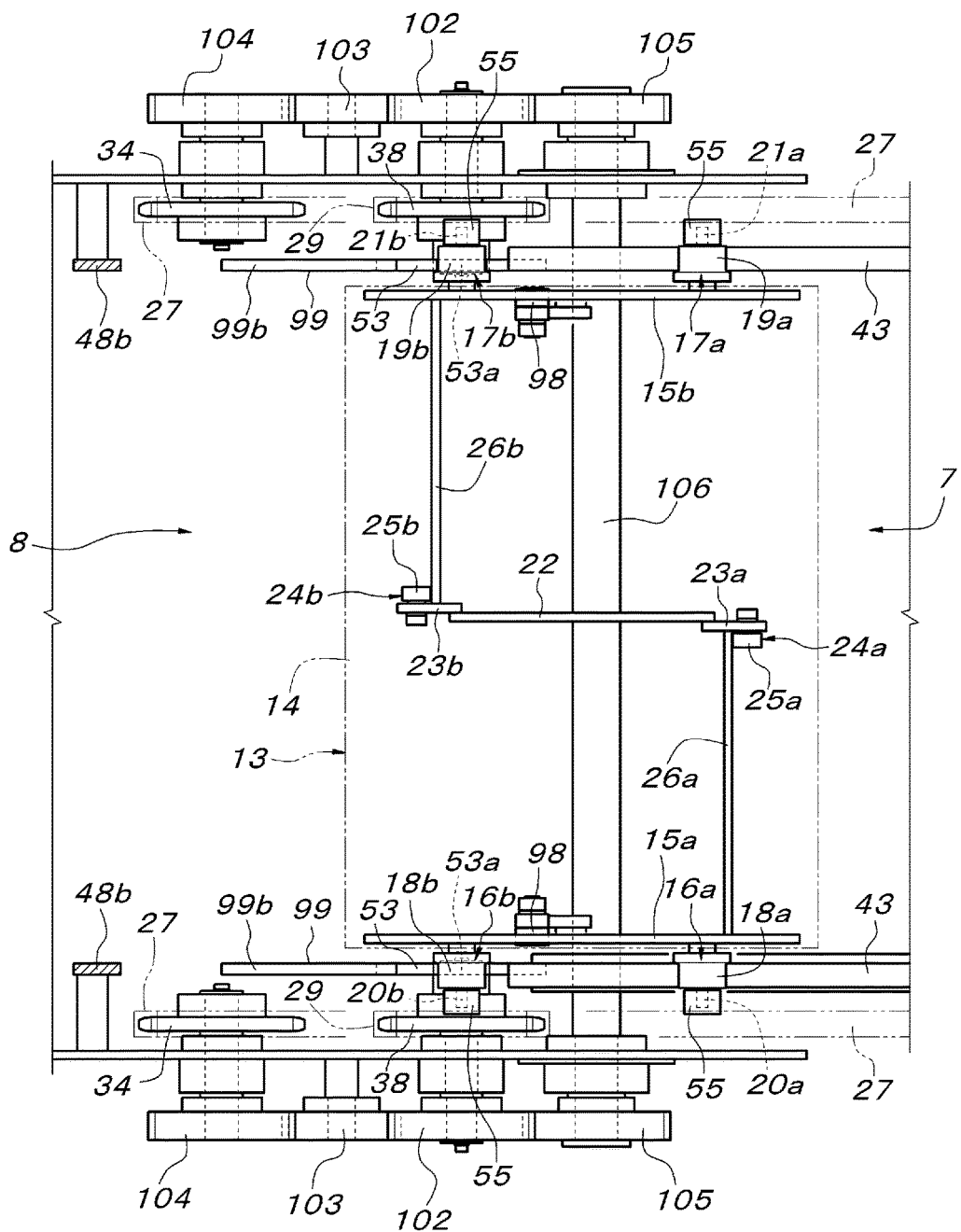
FIG. 17 is a partial cutaway plan view illustrating a fourth turning pathway section.
Figure 18A:
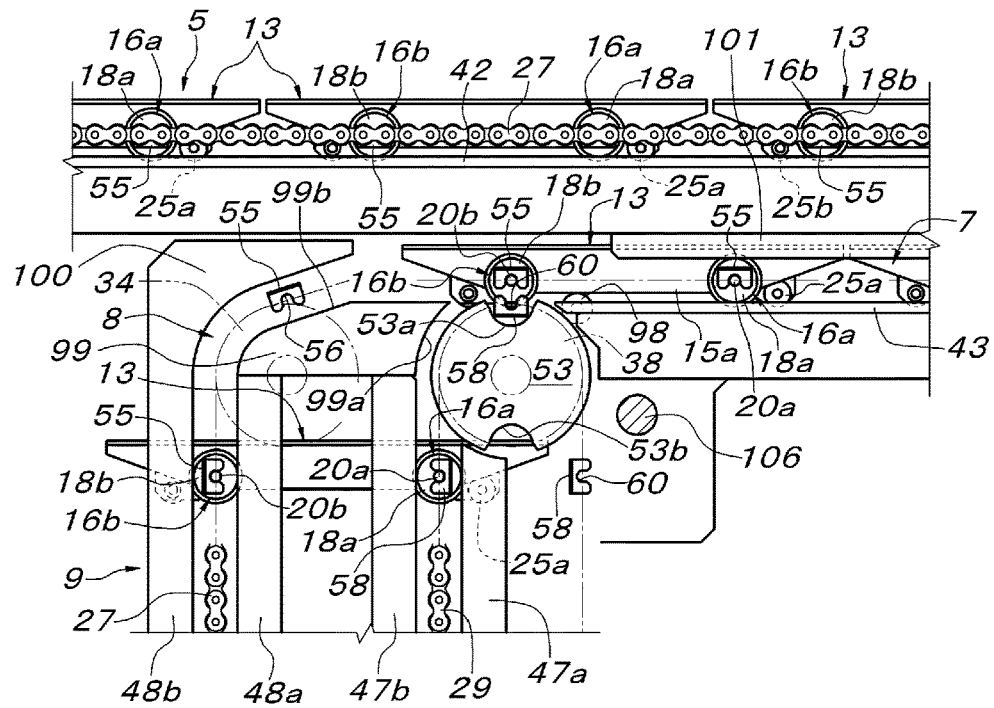
FIG. 18A is a side view of a first stage illustrating the travel of the transporting cart from the third horizontal pathway section through the fourth turning pathway section to a second lifting/lowering pathway section.
Figure 18B:
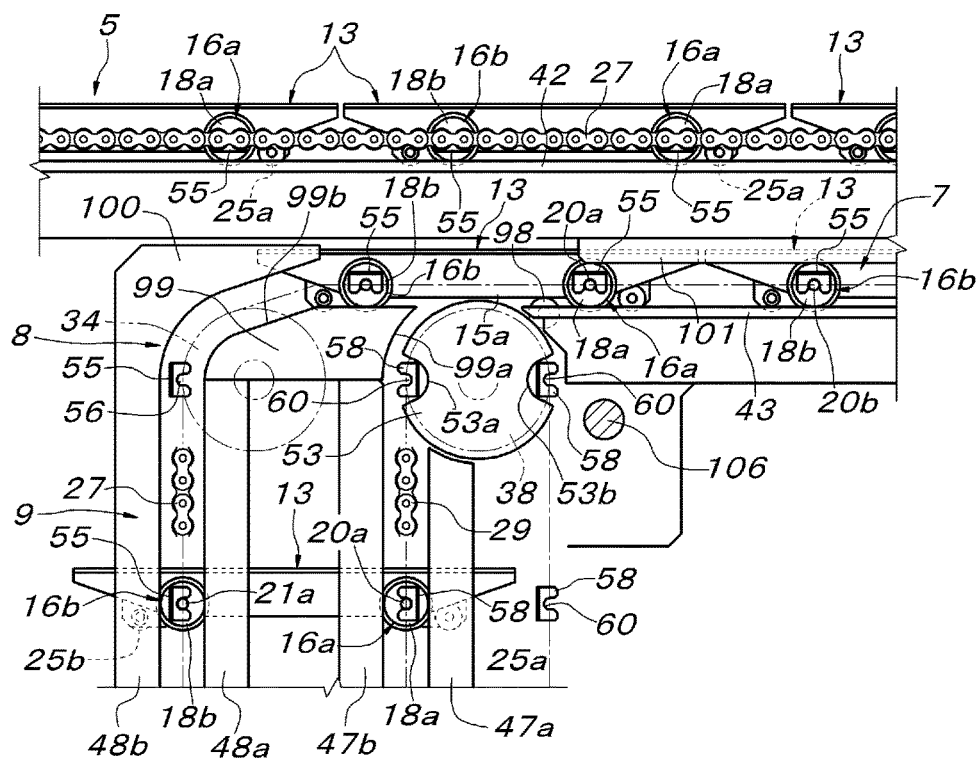
FIG. 18B is a side view of a second stage thereof.
Figure 19A:
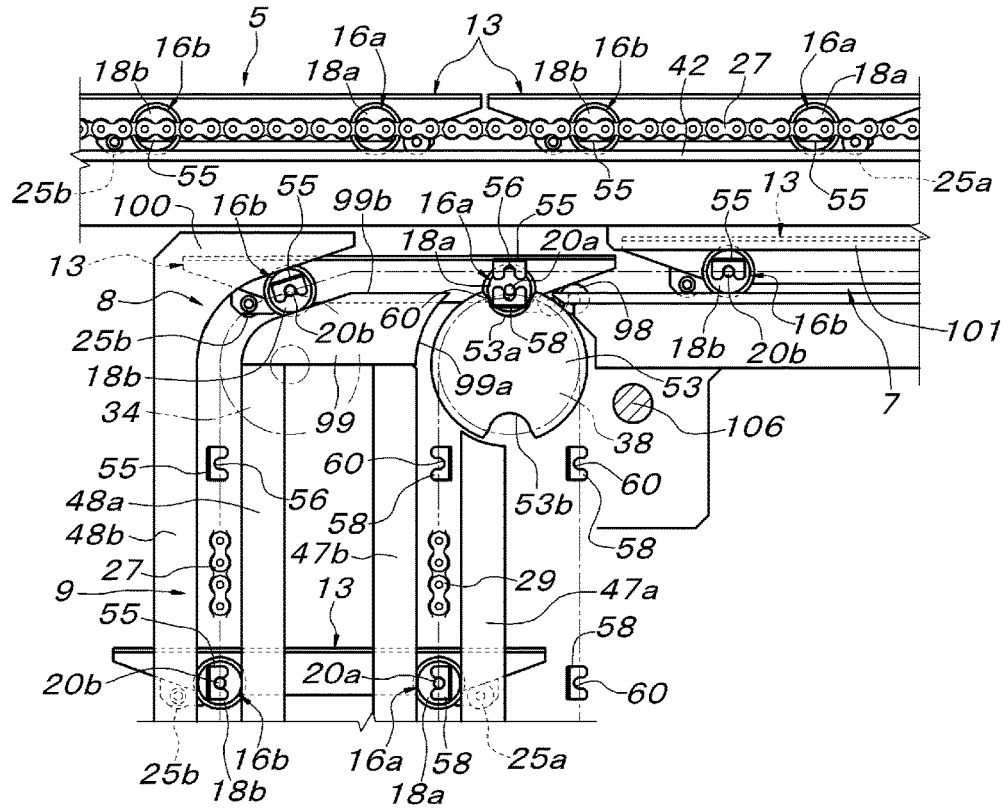
FIG. 19A is a side view of a third stage thereof.
Figure 19B:
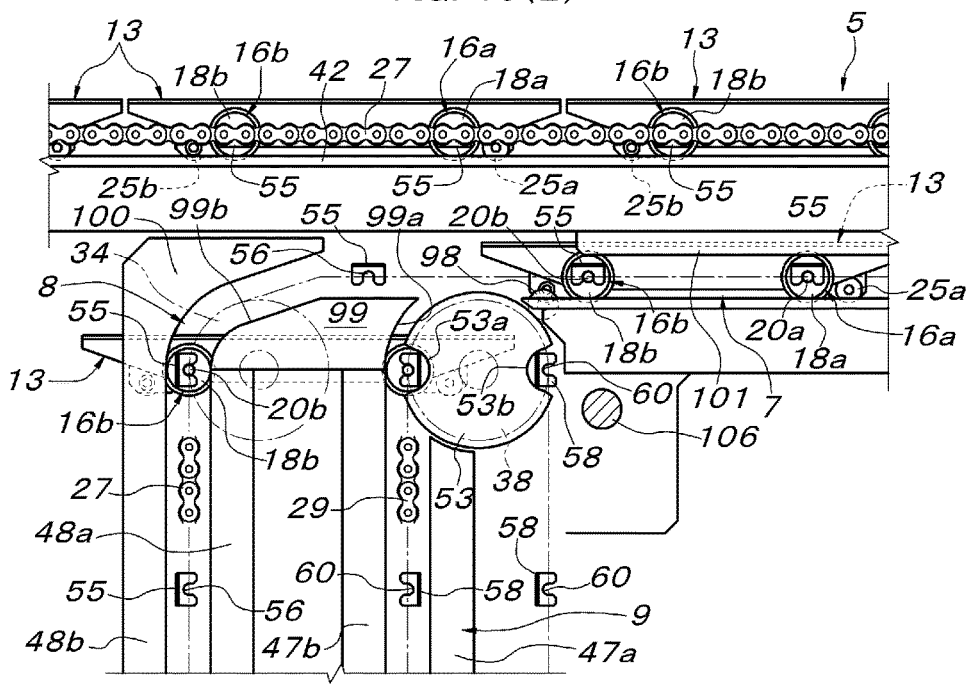
FIG. 19B is a side view of a fourth stage thereof.
Figure 20:
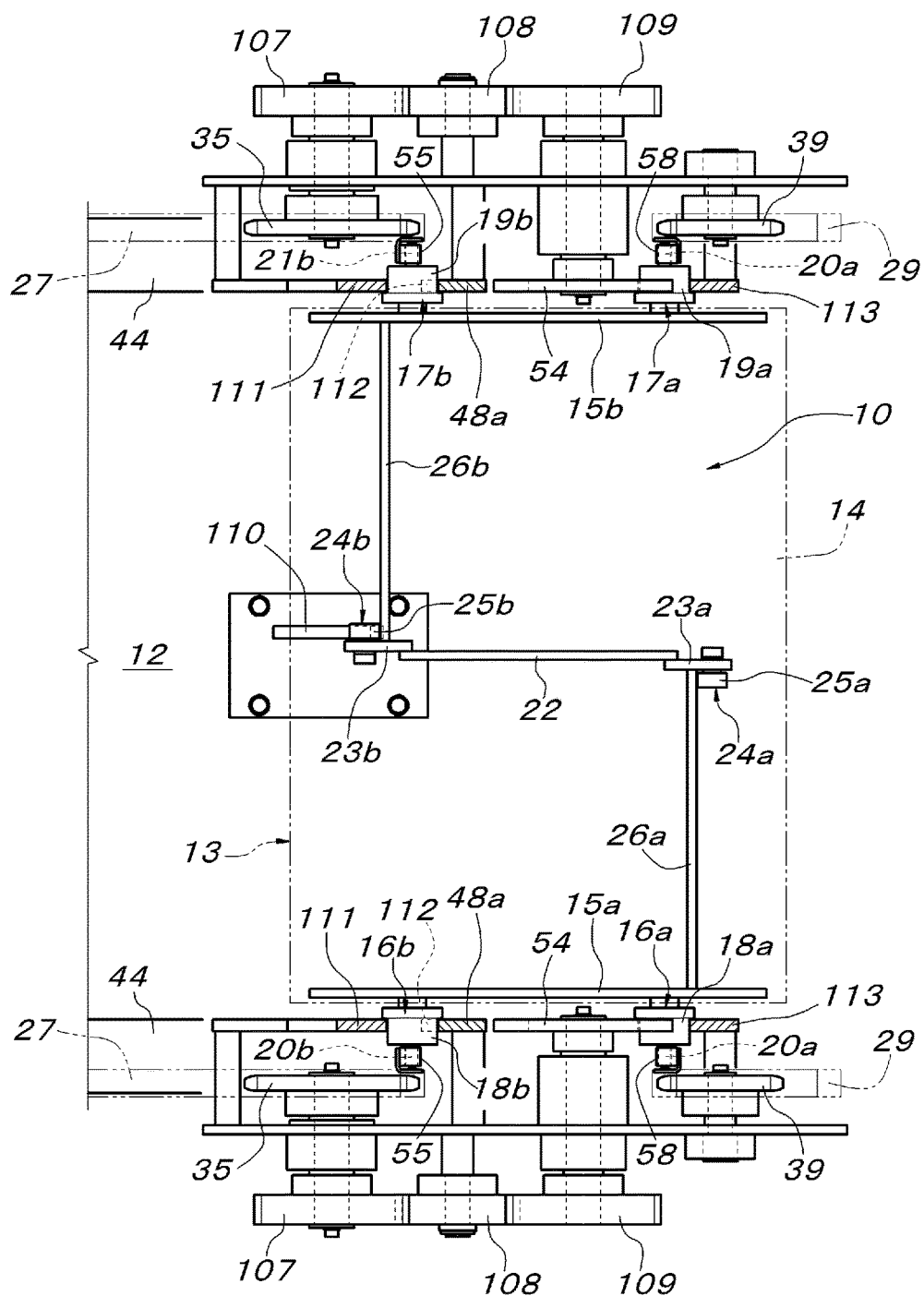
FIG. 20 is a partial cutaway plan view illustrating a fifth turning pathway section.
Figure 21:
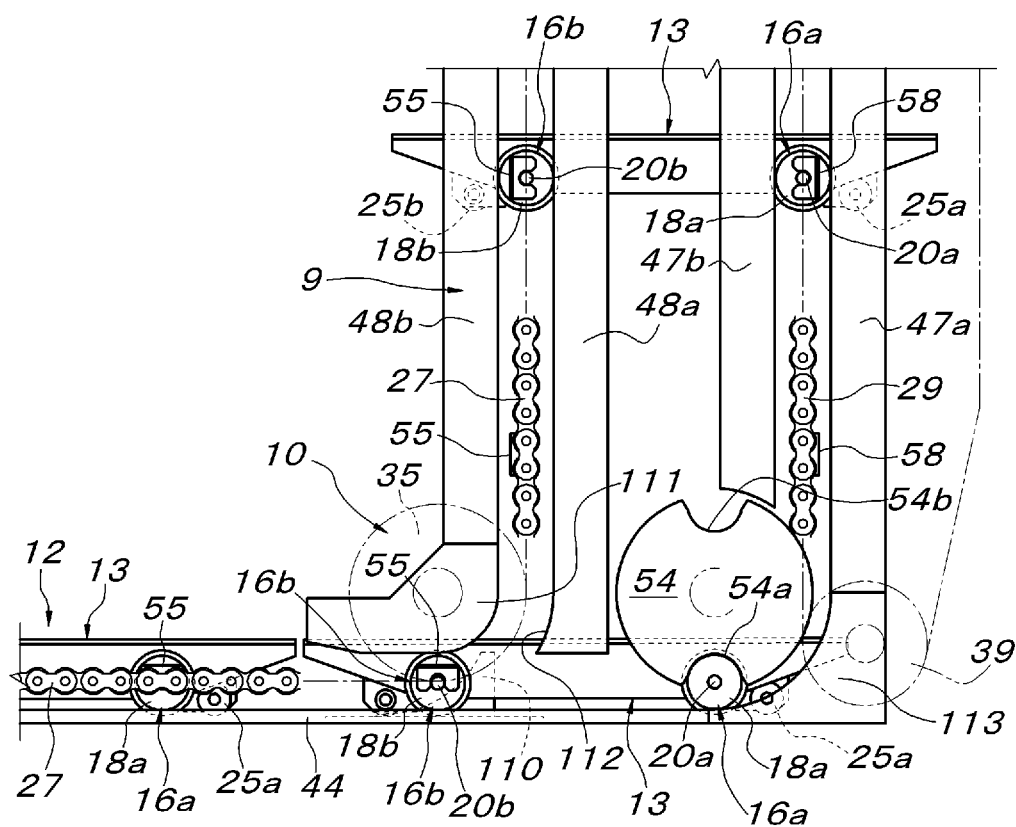
FIG. 21 is a side view of a first stage illustrating the travel of the transporting cart from the second lifting/lowering pathway section through the fifth turning pathway section to the fourth horizontal pathway section.

As shown in FIGS. 17 to 19, in the fourth turning pathway section 8, the upper end guide toothed wheel 38 at the upper end of the second endless chain 29 in the second lifting/lowering pathway section 9 is lowered to such a height so as not to interfere with the engaged sections 16b and 17b on the front side of the transporting cart 13 traveling in the third horizontal pathway section 7. Then, since the turning-section toothed wheel 34 of the first endless chain 27 is pivotally supported at the same level as the upper end guide toothed wheel 38, a downward gradient section of the first endless chain 27 is formed in the upstream of the turning-section toothed wheel 34. An auxiliary support guide roller 98 which corresponds to the auxiliary support guide rollers 69, 70 and 89 that are provided in the sixth turning pathway section 11, the second turning pathway section 4 and the third turning pathway section 6 described previously is pivotally supported to the end part of the horizontal guide rail 43 of the third horizontal pathway section 7. In the third horizontal pathway section 7, at least over the region of the end part on the side of the fourth turning pathway section 8, an upper horizontal guide rail 101 is laid which covers the top of the wheels 18a to 19b of the transporting cart 13 that enters the fourth turning pathway section 8 from the third horizontal pathway section 7.

On the inner side of the pair of left and right upper end guide toothed wheels 38 at the upper end of the second endless chain 29, the auxiliary rotating body 53 that is the same as the auxiliary rotating body 52 of the second turning pathway section 4 and that includes engagement sections 53a and 53b formed with concave sections in which the wheels 18a to 19b are fitted to both sides in the diameter direction is continuously provided concentrically and integrally. The upper end of the vertical guide rail 47b of the pair of front and rear vertical guide rails 47a and 47b provided on the side of the first endless chain 27 in the second lifting/lowering pathway section 9 and the upper end of the vertical guide rail 48a of the pair of front and rear vertical guide rails 48a and 48b provided on the side of the second endless chain 29 are integrally coupled with an inner auxiliary guide rail 99; in the inner auxiliary guide rail 99, an arc-shaped guide rail section 99a which is connected to the upper end of the vertical guide rail 47b and which is concentric with the upper end guide toothed wheel 38 and a lower guide rail section 99b which guides the wheels 18b and 19b on the front side of the transporting cart 13 between vertical guide rails 48a and 48b on the side of the first endless chain 27 are formed; and at the upper end of the vertical guide rail 48b, an outer auxiliary guide rail 100 is continuously provided which guides, with the lower guide rail section 99b, the front-side wheels 18b and 19b of the transporting cart 13 between the vertical guide rails 48a and 48b. A wheel passage formed between the lower guide rail section 99b and the outer auxiliary guide rail 100 guides the front-side wheels 18b and 19b of the transporting cart 13 which has traveled forward in the third horizontal pathway section 7, via a downward gradient inclined passage and an arc-shaped passage concentric with the turning-section toothed wheel 34 of the first endless chain 27, between the vertical guide rails 48a and 48b on the side of the first endless chain 27.

One transmission shaft 106 which has, at both ends, a spur gear 105 meshing with the spur gear 102 of respective spur gear trains 102 to 104 is provided so that the turning-section toothed wheel 34 and the upper end guide toothed wheel 38 present on both left and right sides are respectively coupled with the spur gear trains 102 to 104 so that they interlock at the same speed in the same direction and that the turning-section toothed wheel 34 and the upper end guide toothed wheel 38 on both left and right sides are interlocked with each other. The transmission shaft 106 is supported so as to cross a recessed corner section between the second lifting/lowering pathway section 9 and the third horizontal pathway section 7.

Each transporting cart 13 which is supported by the horizontal guide rail 43 of the third horizontal pathway section 7 via the wheels 18a to 19b is driven to travel via the engagement sections 55 fitted from above to below to the projection shafts 20a to 21b of the respective engaged sections 16a to 17b toward the fourth turning pathway section 8 with the first endless chain 27. When the wheels 18b and 19b on the front side of the transporting cart 13 are separated from the top of the horizontal guide rail 43, the lower sides of both the left and right side plates 15a and 15b of the transporting cart 13 are, as shown in FIG. 18A, supported by the pair of left and right auxiliary support guide rollers 98, and since the upper horizontal guide rail 101 covers the top of the wheels 18a and 19a on the rear side, the wheels 18b and 19b on the front side of the transporting cart 13 can, as shown in FIG. 18B, transfer to the top of the lower guide rail section 99b of the inner auxiliary guide rail 99 without dropping between the horizontal guide rail 43 of the third horizontal pathway section 7 and the lower guide rail section 99b of the inner auxiliary guide rail 99. That is, a transporting cart inclination prevention means is formed that prevents the transporting cart 13 from inclining when the transporting cart 13 transfers from the third horizontal pathway section 7 of the fourth turning pathway section 8 to the second lifting/lowering pathway section 9 with the auxiliary support guide roller 98, the upper horizontal guide rail 101 and the lower guide rail section 99b of the inner auxiliary guide rail 99. Then, when the rear-side wheels 18a and 19a of the transporting cart 13 are separated from the horizontal guide rail 43, since the auxiliary rotating body 53 rotates such that the one engagement section 53a of the auxiliary rotating body 53 interlocking with the first endless chain 27 is, as shown in FIG. 19A, positioned directly below the rear-side wheels 18a and 19a, the rear-side wheels 18a and 19a are fitted to the engagement section 53a of the auxiliary rotating body 53 so as to be separated from the horizontal guide rail 43 and to simultaneously drop slightly.

When the rear-side wheels 18a and 19a are fitted to the engagement section 53a of the auxiliary rotating body 53 so as to drop thereto, the wheels 18b and 19b on the front side move in the downward gradient section between the outer auxiliary guide rail 100 and the lower guide rail section 99b of the inner auxiliary guide rail 99, and thus the transporting cart 13 can maintain a substantially horizontal posture. Thereafter, the engagement section 55 of the first endless chain 27 fitted from above to the front-side wheels 18b and 19b of the transporting cart 13 and the engagement section 58 of the second endless chain 29 fitted from below to the rear-side wheels 18a and 19a of the transporting cart 13 lower in the shape of an arc by the synchronous rotation of the turning-section toothed wheel 34 and the auxiliary rotating body 53 while keeping the same level, and then vertically lower and move in the second lifting/lowering pathway section 9, with the result that the transporting cart 13 lowers in the shape of an arc in the fourth turning pathway section 8 while keeping the horizontal upright posture and then vertically lowers and moves in the second lifting/lowering pathway section 9.

As when the transporting cart 13 moves up in the first lifting/lowering pathway section 3, the transporting cart 13 which lowers in the second lifting/lowering pathway section 9 lowers and moves toward the fifth turning pathway section 10 so as to sandwich the wheels 18a to 19b from both sides forward and backward in a horizontal posture supported by the engagement section 55 of the first endless chain 27 and the engagement section 58 of the second endless chain 29 fitted to the respective wheels 18a to 19b in the horizontal direction. Thereafter, the transporting cart 13 is sent into the original fourth horizontal pathway section 12 through the fifth turning pathway section 10, and the configuration and action of the fifth turning pathway section 10 will next be described with reference to FIGS. 20 to 22.

In the fifth turning pathway section 10, the auxiliary rotating body 54 that is the same as the auxiliary rotating body 53 provided in the fourth turning pathway section 8 and that includes engagement sections 54a and 54b formed with concave sections which are fitted to the wheels 18a and 19a on the rear side of the transporting cart 13 on both sides in the diameter direction is pivotally supported in a position by only the support interval for the transporting cart 13 apart outward (to the opposite side to the side where the fourth horizontal pathway section 12 is present) and horizontally from the turning-section toothed wheel 35 which turns the first endless chain 27 toward the fourth horizontal pathway section 12. By exactly the same action as the turning-section toothed wheel 30 and the auxiliary rotating body 49, the turning-section toothed wheel 32 and the auxiliary rotating body 52, the turning-section toothed wheel 33 and the auxiliary rotating body 50 and the turning-section toothed wheel 34 and the auxiliary rotating body 53 of the respective turning pathway sections, the auxiliary rotating body 54 and the turning-section toothed wheel 35 turn the transporting cart 13 which has lowered in the second lifting/lowering pathway section 9 in the shape of an arc while keeping the horizontal upright posture and send the transporting cart 13 into the fourth horizontal pathway section 12; spur gear trains 107 to 109 for coupling, in an interlocking manner, for each of the left and right, the pair of left and right turning-section toothed wheels 35 and the pair of left and right auxiliary rotating bodies 54 which are driven to rotate by the first endless chain 27 are provided. The second endless chain 29 of the second lifting/lowering pathway section 9 is hung and stretched by the lower end guide toothed wheel 39 such that the engagement section 58 thereof vertically lowers and that thus the rear-side wheels 18a and 19a of the transporting cart 13 to which the engagement section 58 is fitted can be taken over by the engagement sections 54a and 54b of the auxiliary rotating body 54 which rotates synchronously.

On the lower side in the center section between the pair of left and right turning-section toothed wheels 35, a lower protruding cam 110 which performs the same action as the lower protruding cam 66 provided in the third turning pathway section 6 is provided so as to protrude. At the lower end of the outer vertical guide rail 48b of the pair of front and rear vertical guide rails 48a and 48b on the side of the first endless chain 27 in the second lifting/lowering pathway section 9, an inner corner section guide rail 111 for guiding the front-side wheels 18b and 19b of the transporting cart 13 through around the turning-section toothed wheel 35 to the top of the horizontal guide rail 44 of the fourth horizontal pathway section 12 is continuously provided. The horizontal guide rail 44 of the fourth horizontal pathway section 12 is provided so as to extend to the region of the lower side of the auxiliary rotating body 54; the lower end of the inner vertical guide rail 48a which pairs with the vertical guide rail 48b is lowered to such a height so as not to affect the horizontal movement of the rear-side wheels 18a and 19a of the transporting cart 13 on the horizontal guide rail 44; and on the side of the turning-section toothed wheel 35, an arc-shaped rail section 112 for guiding the front-side wheels 18b and 19b sent out onto the horizontal guide rail 44 through around the turning-section toothed wheel 35 with the inner corner section guide rail 111 toward the fourth horizontal pathway section 12 is formed. Furthermore, at the lower end of the outer vertical guide rail 47a of the pair of front and rear vertical guide rails 47a and 47b on the side of the second endless chain 29 in the second lifting/lowering pathway section 9, an outer arc-shaped guide rail 113 is continuously provided which guides the rear-side wheels 18a and 19a fitted to the engagement sections 54a and 54b of the auxiliary rotating body 54 and sent out onto the horizontal guide rail 44 and which is concentric with the auxiliary rotating body 54.

Figure 22A:
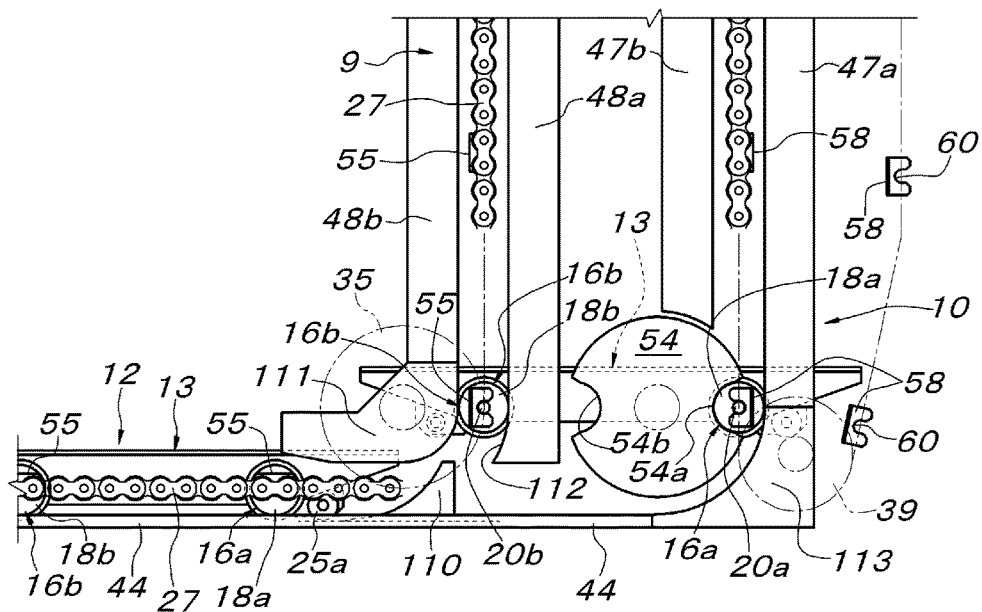
FIG. 22A is a side view of a second stage thereof.
Figure 22B:
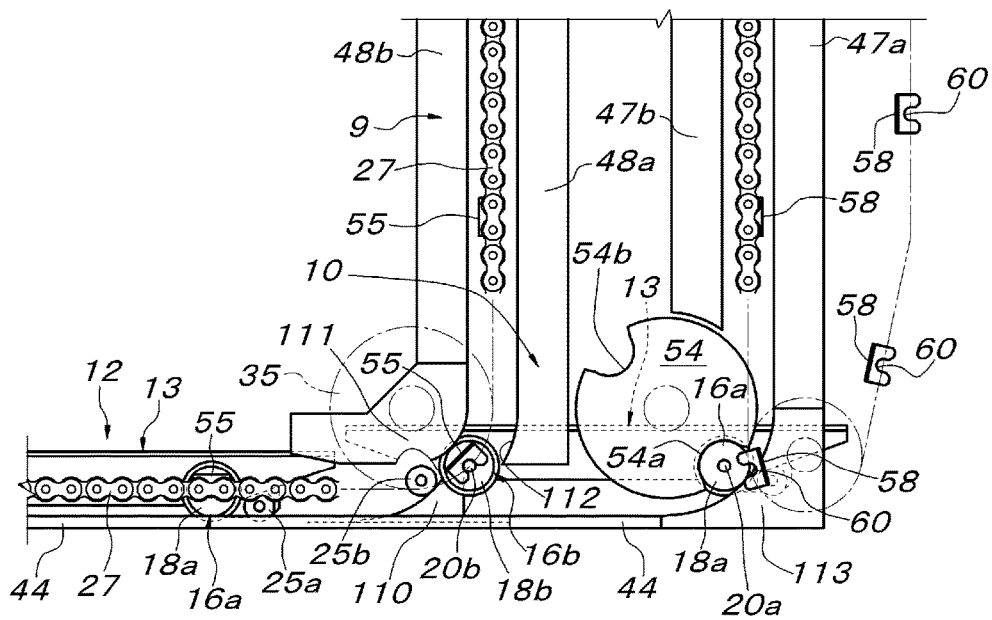
FIG. 22B is a side view of a third stage thereof.

In the configuration of the fifth turning pathway section 10 described above, as shown in FIG. 21, the one engagement section 54a of the auxiliary rotating body 54 which rotates synchronously in an interlocking manner with the second endless chain 29 and the first endless chain 27 is, as shown in FIG. 22A, fitted to the rear-side wheels 18a and 19a of the transporting cart 13 which lowers in the second lifting/lowering pathway section 9 immediately before the engagement section 58 of the second endless chain 29 rotates around the lower end guide toothed wheel 39, and thus the wheels 18a and 19a transfer onto the horizontal guide rail 44 of the fourth horizontal pathway section 12 while being prevented from being removed from the engagement section 54a with the outer arc-shaped guide rail 113. On the other hand, although the front-side wheels 18b and 19b which fit to the engagement section 55 of the first endless chain 27 and which lowers between the vertical guide rails 48a and 48b are guided between the inner corner section guide rail 111 at the lower end of the vertical guide rail 48b of the transporting cart 13 and the arc-shaped rail section 112 at the lower end of the vertical guide rail 48a and lower around the turning-section toothed wheel 35, when the wheels 18b and 19b are removed from the arc-shaped rail section 112 at the lower end of the vertical guide rail 48a, there is no means for directly guiding the wheels 18b and 19b. At this time, as shown in FIG. 22B, the cam-following roller 25*b* on the front side of the bottom section of the transporting cart 13 is received on the lower protruding cam 110.

Since the arc surface of the lower protruding cam 110 is formed on an arc surface whose radius is equal to the rotation path of the engagement section 55 around the turning-section toothed wheel 35, the cam-following roller 25*b* is received by the lower protruding cam 110 and lowers, with the result that the wheels 18*b* and 19*b* smoothly lower while keeping a state where the wheels 18*b* and 19*b* are fitted to the engagement section 55 of the first endless chain 27. Although the lower protruding cam 110 enters an area below the top plate 14 of the transporting cart 13 as with other lower protruding cams 65 and 66 of the sixth turning pathway section 11 and the third turning pathway section 6 and the lower protruding cam 87 of the second turning pathway section 4, since the lower side of the top plate 14 of the transporting cart 13 is configured as described with reference to FIG. 2, the transporting cart 13 which starts to travel horizontally on the horizontal guide rail 44 in the fourth horizontal pathway section 12 can travel and pass the top of the lower protruding cam 110 without any problem.

As described above, the transporting cart 13 travels the closed circulation traveling pathway consisting of the four horizontal pathway sections 1, 5, 7 and 12 and the two lifting/lowering pathway sections 3 and 9 at a constant speed while keeping the horizontal upright posture whereas in the turning pathway sections 2, 6, 10 and 11 having the lower protruding cams 65, 66, 87 and 110, at the time of the start of the turn or the completion of the turn when the support is unstable, in a state where the three places of the transporting cart 13 which are any one of the front and rear pairs of left and right engaged sections among the four front, rear, left and right engaged sections 16*a* to 17*b* in the transporting cart 13 and one auxiliary supported section of the two front and rear auxiliary supported sections 24*a* and 24*b* (the cam-following rollers 25*a* and 25*b*) located on the opposite side to the engaged sections forward and backward are stably supported, it is possible to smoothly start or complete the turn.

As described previously, the engagement section 55 of the first endless chain 27 and the engagement sections 57 and 58 of the second endless chains 28 and 29 are attached with a pitch equal to the support interval L (the interval between the front and rear of the wheels 18*a* to 19*b*) for the transporting cart 13, and it is configured such that the total length L2 of the transporting cart 13 is slightly shorter than twice the support interval L for the transporting cart 13, with the result that in the horizontal pathway sections 1, 5, 7 and 12, the respective transporting carts 13 can be made to travel in a continuous state where both the front and rear ends of the top plate 14 are adjacent to each other. Then, in the lifting/lowering pathway sections 3 and 9, in a state where the wheels 18*a* and 19*a* of the transporting carts 13 are separated forward and backward and are individually supported by the engagement sections 55 of the first endless chain 27 and the engagement sections 57 and 58 of the second endless chains 28 and 29, the transporting carts 13 move up and lower parallel to each other while keeping the horizontal upright posture. As described above, when the transporting carts 13 move up and lower in the lifting/lowering pathway sections 3 and 9, the vertical interval between the transporting carts 13 is twice as long as the support interval L for the transporting cart 13.

For example, as shown in FIG. 1, the transporting device described above can be used for the transport of the load W such that the load W is loaded on the transporting cart 13 located in the beginning end part of the low-position first horizontal pathway section 1 and that the load W is unloaded from the transporting cart 13 located in the terminal end part of the high-position second horizontal pathway section 5. It is a matter of course that the transporting device described above can be used such that the first endless chain 27 and the second endless chains 28 and 29 are reversely rotated so as to transport the load W from on the high-position second horizontal pathway section 5 to on the low-position first horizontal pathway section 1. In any case, the loading and unloading of the load W with respect to the transporting cart 13 can be performed with the turning-section toothed wheel 30 of the sixth turning pathway section 11 and the auxiliary rotating body 49 (the turning-section toothed wheel 33 of the third turning pathway section 6 and the auxiliary rotating body 50) either with respect to the transporting cart 13 supported at the same level as the first horizontal pathway section 1 (the second horizontal pathway section 5) or with respect to the transporting cart 13 supported by the first horizontal pathway section 1 (the second horizontal pathway section 5 further upstream than the third turning pathway section 6) further downstream than the sixth turning pathway section 11.

The circulation traveling pathway of the transporting cart 13 described in the above embodiment is an example, and is not restricted thereto. That is, transporting devices of various types of layouts can be configured by combining part or the whole of the first turning pathway section 2 to the sixth turning pathway section 11 with horizontal pathway sections having arbitrary lengths. For example, it is possible to easily realize a layout in which the fourth turning pathway section 8 in the above embodiment is made reverse in front and rear and in which the upper end of the second lifting/lowering pathway section 9 is directly connected to the second horizontal pathway section 5, a layout in which the second turning pathway section 4 is made reverse in front and rear and in which the lower end of the first lifting/lowering pathway section 3 is directly connected to the fourth horizontal pathway section 12, a layout in which both the layouts described above are combined, in which the third turning pathway section 6, the third horizontal pathway section 7, the sixth turning pathway section 11 and the first horizontal pathway section 1 are omitted and in which the transporting carts 13 are circulated in the shape of a rectangle and the like. Furthermore, it is possible to realize, as necessary, a layout in which the transporting carts 13 travel in a circulating manner in a concave shape or a convex shape and the like.

The cart-type transporting device of the present invention can be utilized as a transporting device in which in a lifting/lowering pathway section provided in the circulation traveling pathway of a transporting cart, a chain conveyor for propelling the transporting cart in a horizontal pathway section is used as it is without use of a dedicated lifter and in which thus it is possible to stably and smoothly lift and lower the transporting cart.

What is claimed is:
1. A cart-type transporting device comprising:
a traveling pathway which includes a turning pathway section in a vertical direction between a horizontal pathway section and a separate traveling pathway section connected thereto;
a transporting cart which travels the traveling pathway while keeping a horizontal upright posture; and
a drive means which makes the transporting cart travel in the traveling pathway, wherein the transporting cart is supported via wheels such that the transporting cart travels on guide rails, and includes engaged sections which are provided at two front and rear places on each of both left and right sides so as to protrude horizontally and laterally and an auxiliary supported section which is provided at a bottom section, the drive means includes a pair of left and right endless chains which rotate along the traveling pathway through a turning-section toothed wheel pivotally supported to the turning pathway section, a pair of left and right auxiliary rotating bodies which interlock with the pair of left and right endless chains, and an auxiliary guide member, each of the pair of left and right endless chains includes engagement sections which are detachably fitted to a pair of the front and rear engaged sections of the transporting cart, each of the pair of left and right auxiliary rotating bodies includes an engagement section which is pivotally supported in a position by only an interval between the pair of front and rear engaged sections apart from the turning-section toothed wheel in a horizontal direction and which engages with the engaged section removed from the engagement section of one of the pair of left and right endless chains, the auxiliary guide member includes a lower protruding cam which is provided at such a height so as not to interfere with the transporting cart that enters and exits the turning pathway section at a lowest level and which supports and guides the auxiliary supported section of the transporting cart that turns and a pair of left and right engaged-section-guiding guide rails which are laid along an outer side of an engaged section rotating pathway on a side far from the horizontal pathway section, and the lower protruding cam maintains, in a lower end side region of an engaged section rotating pathway on a side close to the horizontal pathway section, an engagement state of the engagement section of the pair of left and right endless chains or the auxiliary guide member and the engaged section of the transporting cart.

2. The cart-type transporting device according to claim 1, wherein the engaged sections of the transporting cart are formed with wheels which are pivotally supported to the two front and rear places on each of both the left and right sides of the transporting cart and which include projection shafts that are provided so as to protrude outward and concentrically, and the engagement sections of the pair of left and right endless chains are formed with members which include concave sections that fit in the up/down direction to the projection shafts in the horizontal pathway section.

3. The cart-type transporting device according to claim 1 wherein the auxiliary supported sections are provided at two front and rear places in a center section of the bottom section of the transporting cart in a left/right width direction, and the two front and rear auxiliary supported sections are displaced in the left/right width direction of the transporting cart so as not to overlap each other when the transporting cart is seen in a front view.

4. The cart-type transporting device according to claim 3, wherein the transporting cart is formed such that the wheels are pivotally supported to outer sides of both left and right side plates which are provided so as to protrude downward from both left and right sides of a top plate, the two front and rear auxiliary supported sections are attached to a lower side of the top plate, a space below the top plate from the auxiliary supported section on the front side to a rear end of the transporting cart is opened backward, and the auxiliary supported section on the front side is directly viewable from behind through the space below the top plate, and a space below the top plate from the auxiliary supported section on the rear side to a front end of the transporting cart is opened forward, and the auxiliary supported section on the rear side is directly viewable from the front thereof through the space below the top plate.

5. The cart-type transporting device according to claim 1, wherein the auxiliary supported section is formed with a cam-following roller which is pivotally supported with a horizontal support shaft in a left/right direction.

6. The cart-type transporting device according to claim 1, wherein the separate traveling pathway section is connected downward from the horizontal pathway section through the turning pathway section, in the horizontal pathway section, a transporting cart inclination prevention means is also provided which prevents the wheels of the transporting cart from dropping between the turning-section toothed wheel of the horizontal pathway section and the auxiliary rotating body, and the transporting cart inclination prevention means is formed with an upper guide rail which is laid on an upper side of the horizontal pathway section so as to cover the wheels of the transporting cart from above and a support guide roller which is pivotally supported to a lower side of the horizontal pathway section so as to support the transporting cart.

7. The cart-type transporting device according to claim 6, wherein in the transporting cart inclination prevention means, a lower guide rail is additionally provided which is laid between the turning-section toothed wheel and the auxiliary rotating body except a wheel rotating pathway on a side close to the horizontal pathway section among the front and rear wheels of the transporting cart and which supports the wheels of the transporting cart from below.

8. The cart-type transporting device according to claim 2, wherein the separate traveling pathway section is a lifting/lowering pathway section which is connected upward from the horizontal pathway section through the turning pathway section, in the lifting/lowering pathway section, a first endless chain which is continuous with the horizontal pathway section through the turning-section toothed wheel and a second endless chain which interlocks with the first endless chain so as to rotate along the lifting/lowering pathway section are provided, the second endless chain is located closer to the horizontal pathway section than the first endless chain in the lifting/lowering pathway section, a lower end guide toothed wheel thereof and the turning-section toothed wheel are pivotally supported at a same height higher than the first endless chain of the horizontal pathway section, the first endless chain of the horizontal pathway section is inclined obliquely upward at a lower end of the lifting/lowering pathway section, the auxiliary rotating body is provided so as to rotate concentrically and integrally with the lower end guide toothed wheel of the second endless chain, the engagement section of the auxiliary rotating body is formed with a concave section to and from which the wheel where the projection shaft is fitted to the engagement section of the second endless chain is detachably fitted, and the lower protruding cam of the auxiliary guide member allows the engaged section of the transporting cart to transfer between the engagement sections of the second endless chain rotating around the lower end guide toothed wheel and the auxiliary rotating body and an end part of the horizontal pathway section on a side of the lower end guide toothed wheel.

9. The cart-type transporting device according to claim 2, wherein the separate traveling pathway section is a lifting/lowering pathway section which is connected upward from the horizontal pathway section through the turning pathway section, in the lifting/lowering pathway section, a first endless chain which is continuous with the horizontal pathway section through the turning-section toothed wheel and a second endless chain which interlocks with the first endless chain so as to rotate along the lifting/lowering pathway section are provided, the second endless chain is located farther from the horizontal pathway section than the first endless chain in the lifting/lowering pathway section, the auxiliary rotating body is pivotally supported to a lower end guide toothed wheel of the second endless chain so as to be adjacent to a side where the turning-section toothed wheel is present, the engagement section of the auxiliary rotating body is formed with a concave section to and from which the wheel where the projection shaft is fitted to the engagement section of the second endless chain is detachably fitted, and the lower protruding cam of the auxiliary guide member maintains, in the lower end side region of the engaged section rotating pathway around the turning-section toothed wheel, an engagement state of the engagement section of the first endless chain and the engaged section of the transporting cart.

\* \* \* \* \*